(12) United States Patent
Kasahara et al.

(10) Patent No.: US 8,041,850 B2
(45) Date of Patent: Oct. 18, 2011

(54) STORAGE APPARATUS AND DATA INTEGRITY ASSURANCE METHOD

(75) Inventors: Shinichi Kasahara, Odawara (JP); Osamu Torigoe, Fujisawa (JP); Tetsuya Kojima, Kamakura (JP); Takeshi Ishiguro, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 133 days.

(21) Appl. No.: 12/310,670

(22) PCT Filed: Feb. 19, 2009

(86) PCT No.: PCT/JP2009/000714
§ 371 (c)(1),
(2), (4) Date: Mar. 4, 2009

(87) PCT Pub. No.: WO2010/095173
PCT Pub. Date: Aug. 26, 2010

(65) Prior Publication Data
US 2010/0211703 A1    Aug. 19, 2010

(51) Int. Cl.
*G06F 3/00* (2006.01)
*G06F 13/28* (2006.01)
*G06F 13/38* (2006.01)
*G06F 5/00* (2006.01)

(52) U.S. Cl. ............... 710/22; 710/2; 710/52; 710/65

(58) Field of Classification Search ............. 710/22, 710/52, 65
See application file for complete search history.

(56) References Cited

U.S. PATENT DOCUMENTS

| | | | | | |
|---|---|---|---|---|---|
| 5,617,432 | A | * | 4/1997 | Eggenberger et al. | 714/752 |
| 5,918,055 | A | * | 6/1999 | Crawford et al. | 710/240 |
| 7,039,758 | B2 | * | 5/2006 | Mannen et al. | 711/114 |
| 7,106,463 | B1 | * | 9/2006 | Makitani | 358/1.15 |
| 2004/0158793 | A1 | * | 8/2004 | Blightman et al. | 714/758 |
| 2005/0055522 | A1 | | 3/2005 | Yagi | |
| 2006/0129901 | A1 | | 6/2006 | Arataki et al. | |
| 2008/0195837 | A1 | | 8/2008 | Ishii et al. | |
| 2008/0222500 | A1 | | 9/2008 | Tsukamoto et al. | |

FOREIGN PATENT DOCUMENTS
JP    2005-84799    9/2003

OTHER PUBLICATIONS
International Search Report of PCT/JP2009/000714 mailed Nov. 27, 2009.

* cited by examiner

*Primary Examiner* — Alford W Kindred
*Assistant Examiner* — Zachary K Huson
(74) *Attorney, Agent, or Firm* — Stites & Harbison PLLC; Juan Carlos A. Marquez, Esq.

(57) ABSTRACT

A channel control unit of a storage apparatus is provided with: a variable-length DMA (Direct Memory Access) that performs data transfer of variable-length data sent to or received from the host computer in accordance with an I/O request; a fixed-length DMA that performs data transfer of fixed-length data to and from the cache memory; and a buffer intervening between the variable-length DMA and the fixed-length DMA. In performing the data transfer of the fixed-length data to the cache memory, the fixed-length DMA divides the variable-length data into multiple sets of the fixed-length data each having a data size equivalent to a unit size of data managed in the cache memory, and adds a first integrity code to the last fixed-length data set of the fixed-length data sets generated by the division, the first integrity code being generated based on the entire variable-length data.

16 Claims, 21 Drawing Sheets

[Fig. 1]
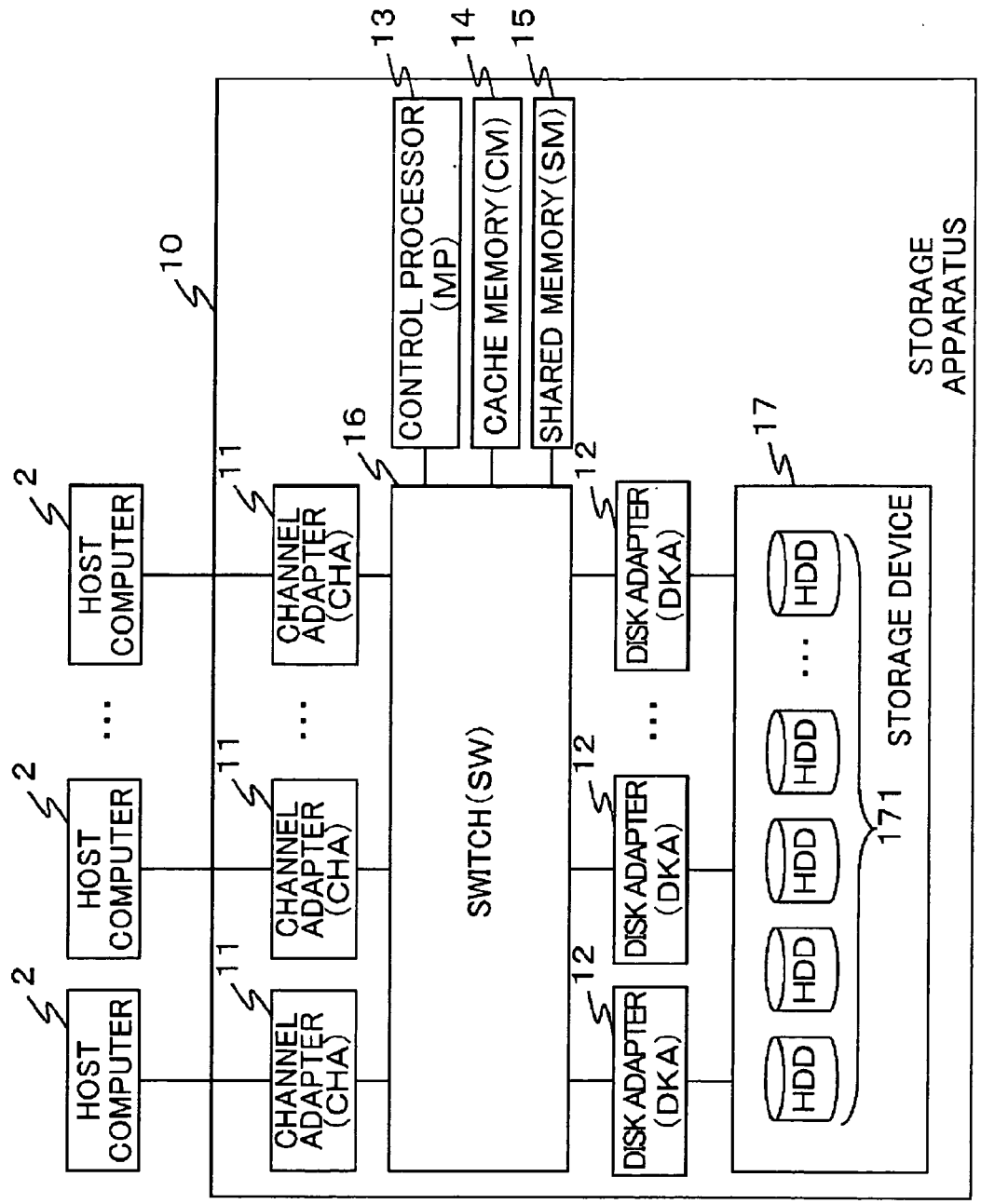

[Fig. 2]
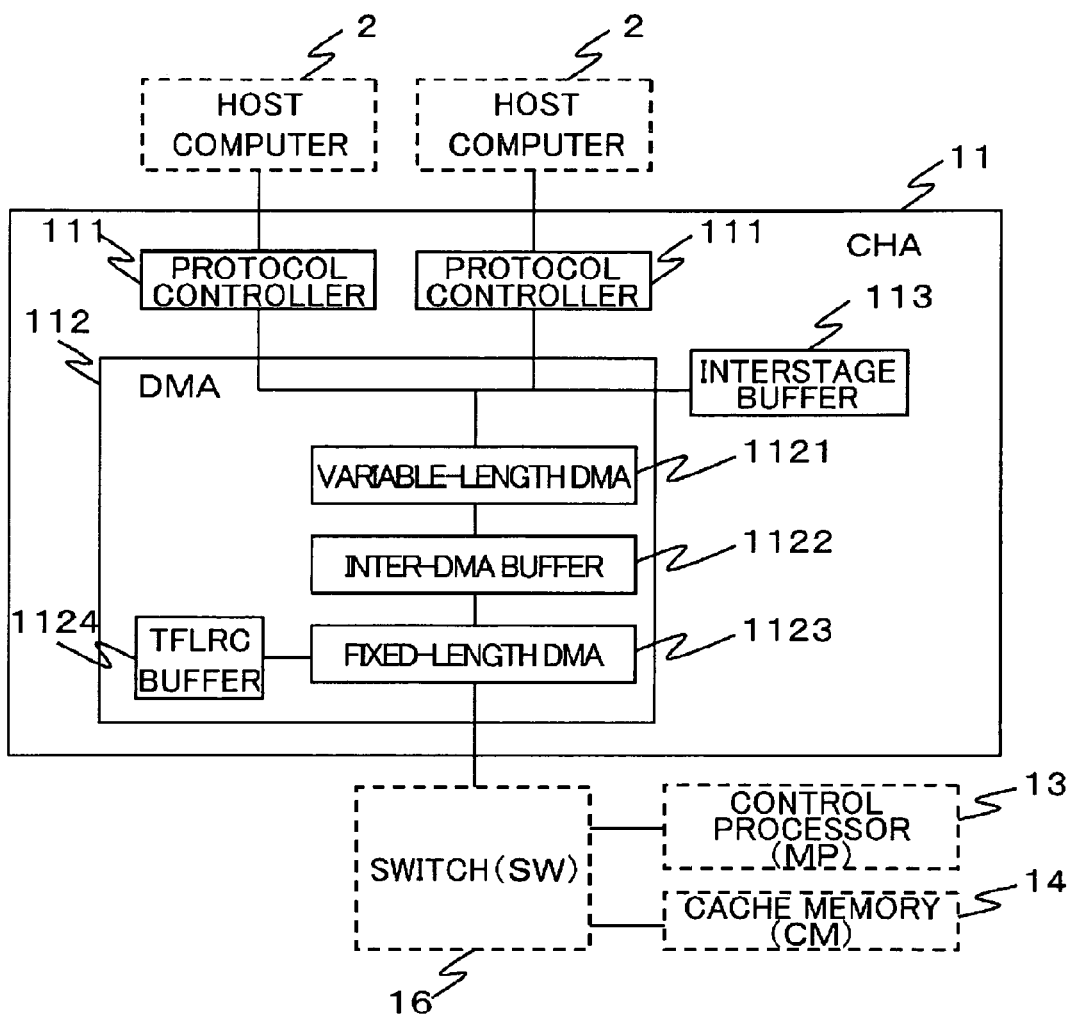

[Fig. 3]
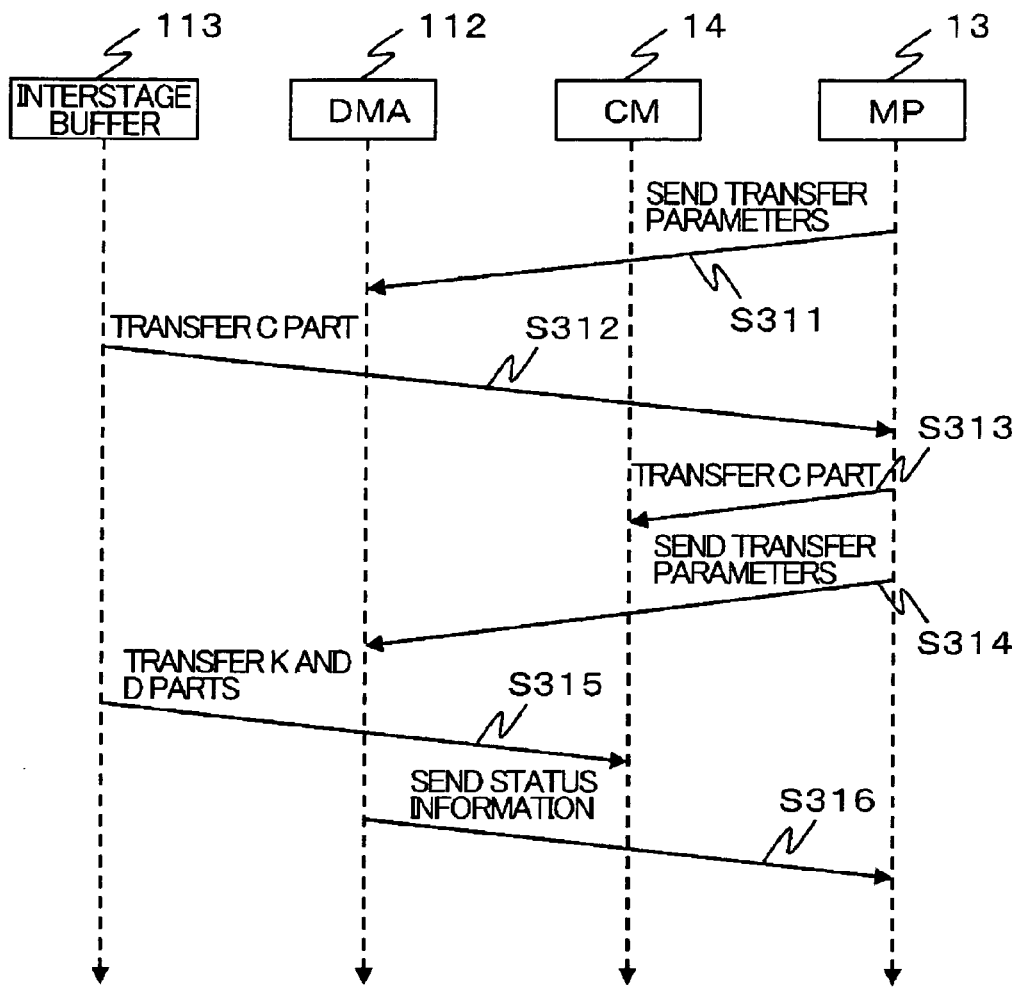
[Fig. 4]
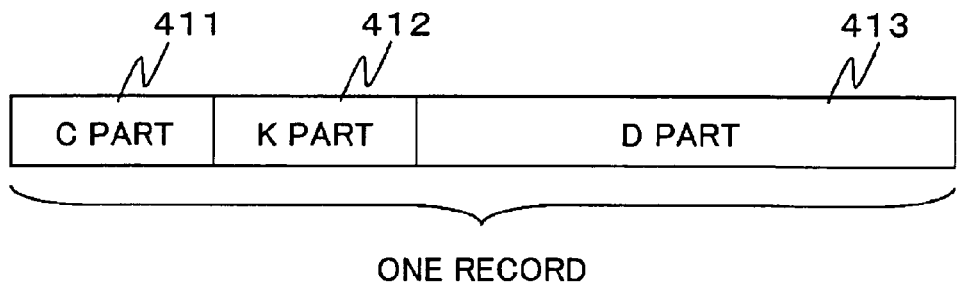

[Fig. 5]

EXAMPLES OF VARIABLE-LENGTH DMA PARAMETER

| NAME OF PARAMETER | DEFINITION |
|---|---|
| READ/WRITE | SPECIFY TRANSFER DIRECTION<br>0:READ  1:WRITE |
| CHID | CHAIN NUMBER<br>SPECIFY ARBITRARY VALUE AS CCW CHAIN NUMBER<br>COMPARE CCW CHAIN NUMBER WITH FIXED-LENGTH DMA CHAIN NUMBER TO CHECK IF CHAIN NUMBERS HAVE SAME I/O PARAMETER |
| CCNT | TRANSFER COUNTER: VALUE FROM 0 (IN DUMMY TRANSFER) IS SETTABLE<br>TO TRANSMIT DATA EXCEEDING THE TRANSFER COUNTER, ACTIVATE MULTIPLE TIMES BY DIVIDING CCNT |
| DXP | INTERSTAGE BUFFER ADDRESS POINTER<br>SET TRANSFER-START ADDRESS VALUE OF INTERSTAGE BUFFER |

[Fig. 6]

EXAMPLES OF FIXED-LENGTH DMA PARAMETER

| NAME OF PARAMETER | DEFINITION |
|---|---|
| READ/WRITE | SPECIFY TRANSFER DIRECTION<br>0:READ  1:WRITE |
| CHID | CHAIN NUMBER<br>SPECIFY ARBITRARY VALUE AS FIELD CHAIN NUMBER<br>COMPARE FIELD CHAIN NUMBER WITH VARIABLE-LENGTH DMA CHAIN NUMBER TO CHECK IF CHAIN NUMBERS HAVE SAME I/O PARAMETER |
| TF | Total FLRC BIT<br>'0'    TFLRC MODE IS DISABLED<br>'1'    TFLRC MODE IS ENABLED |
| FF | FirstField BIT: INDICATING TRANSFER OF FIRST FIELD<br>CLEAR DMA MULTIPLE-SURFACE INFORMATION BEFORE TRANSFER START OF PARAMETER WHOSE FF BIT IS ON |
| LF | LastField BIT: INDICATING TRANSFER OF LAST FIELD<br>USED AS CONDITION FOR DETECTING IO SHORT |
| SOP | SUB-BLOCK OFFSET POINTER<br>SET OFFSET FROM SUB-BLOCK BOUNDARY<br>SET SOP=0X00 WHEN TRANSFER STARTS FROM SUB-BLOCK BOUNDARY |
| BOP | BLOCK OFFSET POINTER<br>SET OFFSET FROM BLOCK BOUNDARY<br>SET BOP=0X00 WHEN TRANSFER STARTS FROM BLOCK BOUNDARY |
| FBADL | SET TRANSFER DATA LENGTH IN DATA TRANSFER |
| ADR | TRANSFER ADDRESS |

[Fig. 7A]
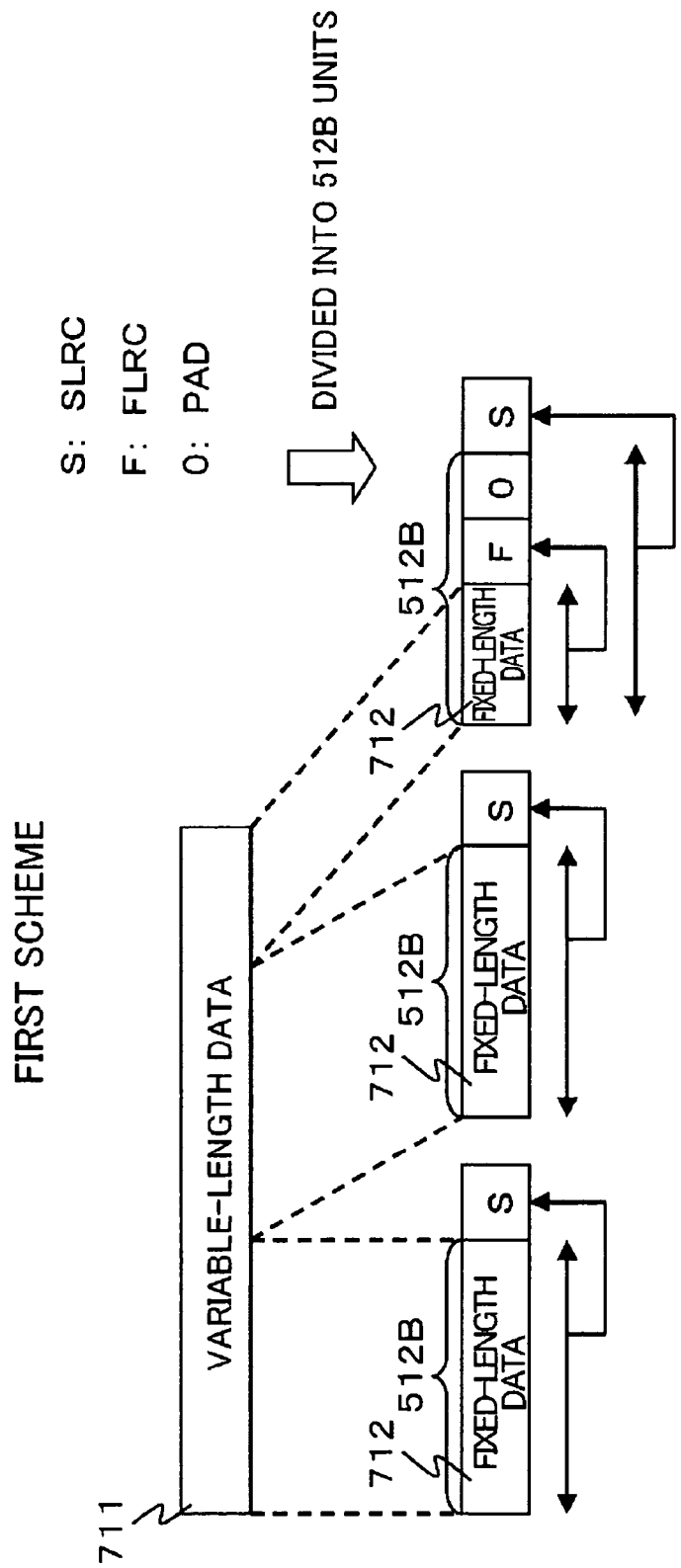

[Fig. 7B]
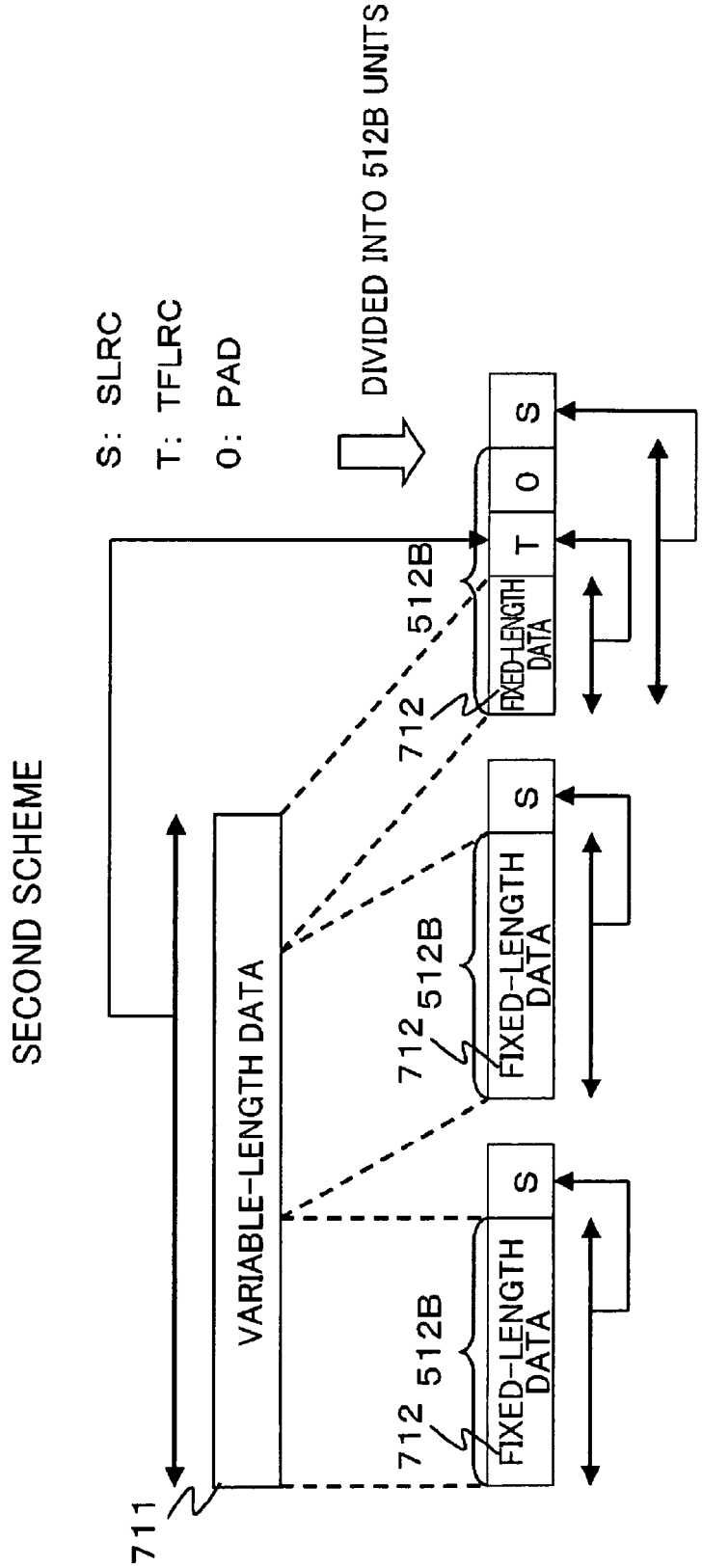

[Fig. 8A]
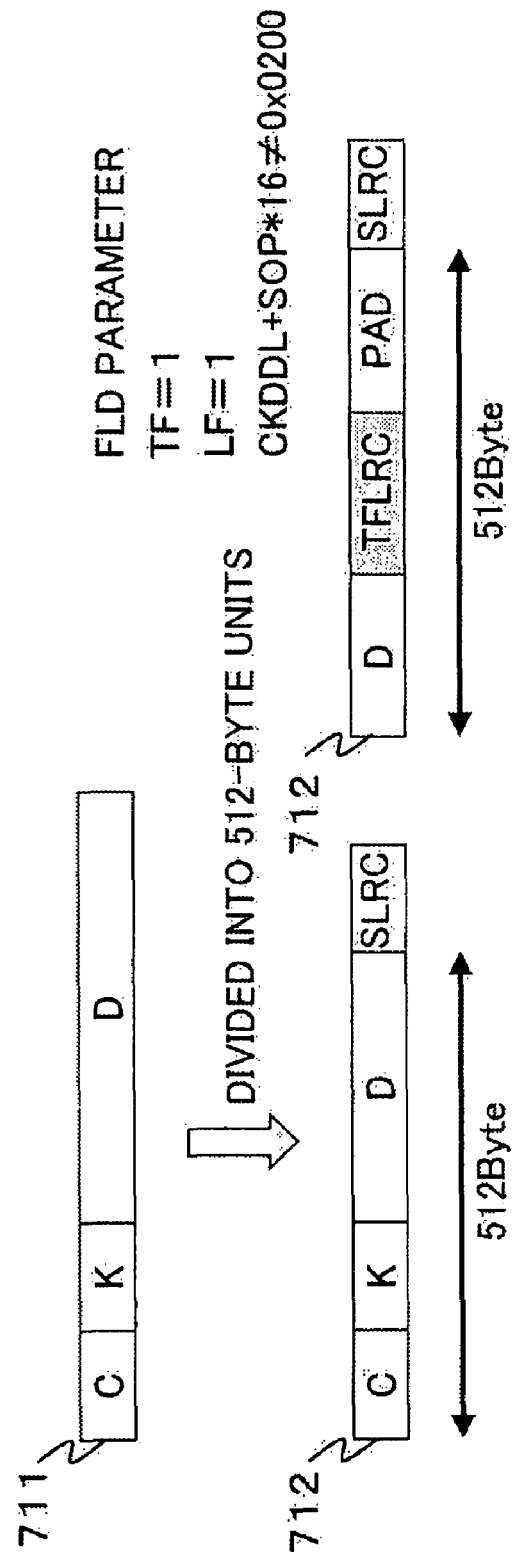

[Fig. 8B]
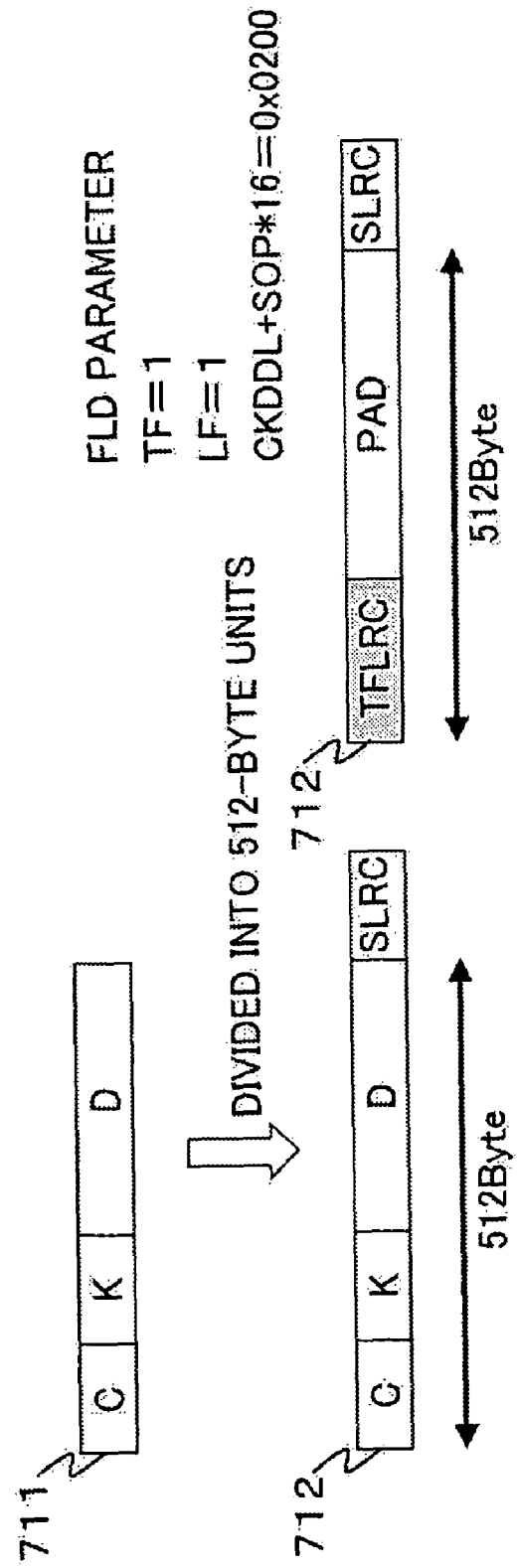

[Fig. 8C]
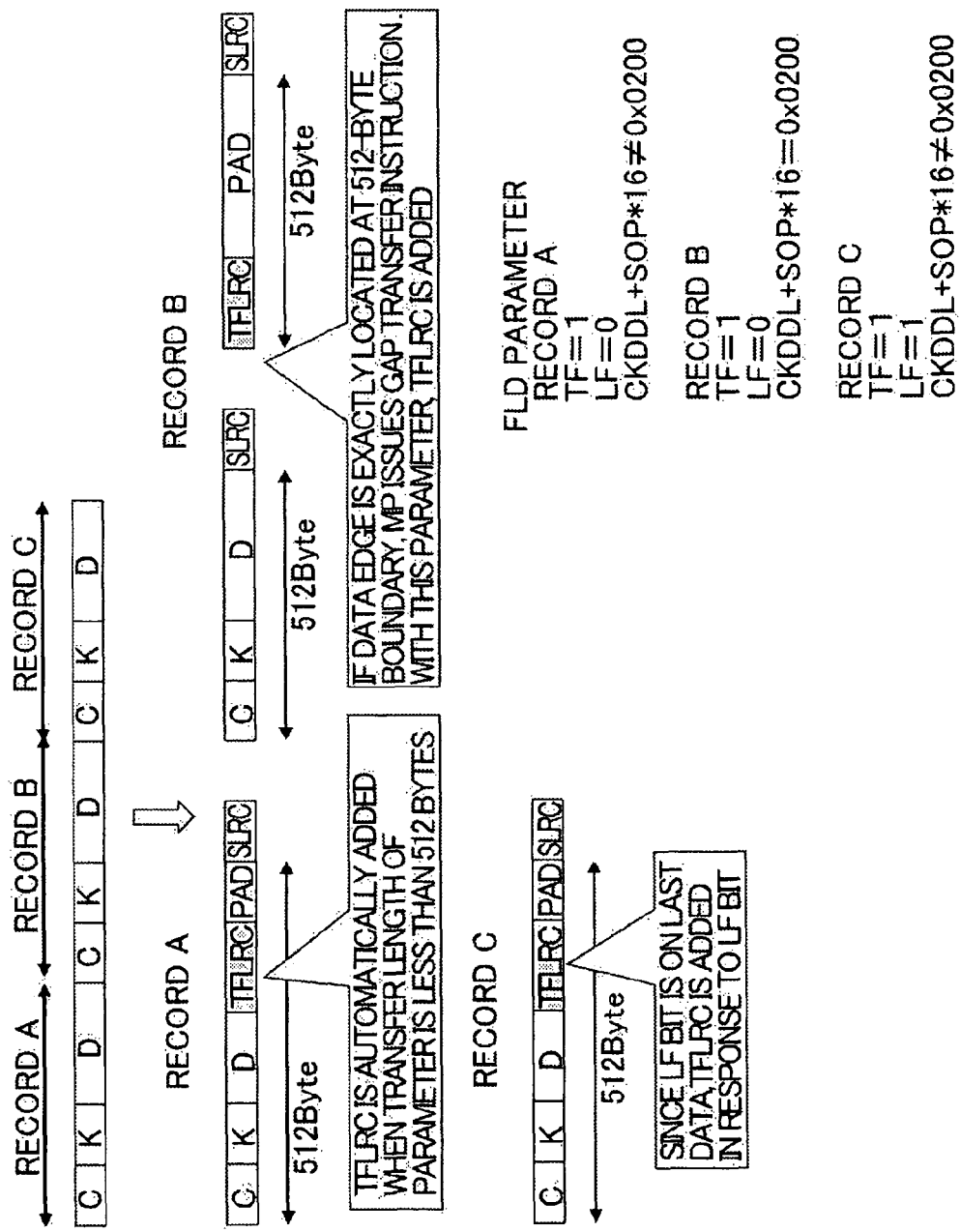

[Fig. 9]
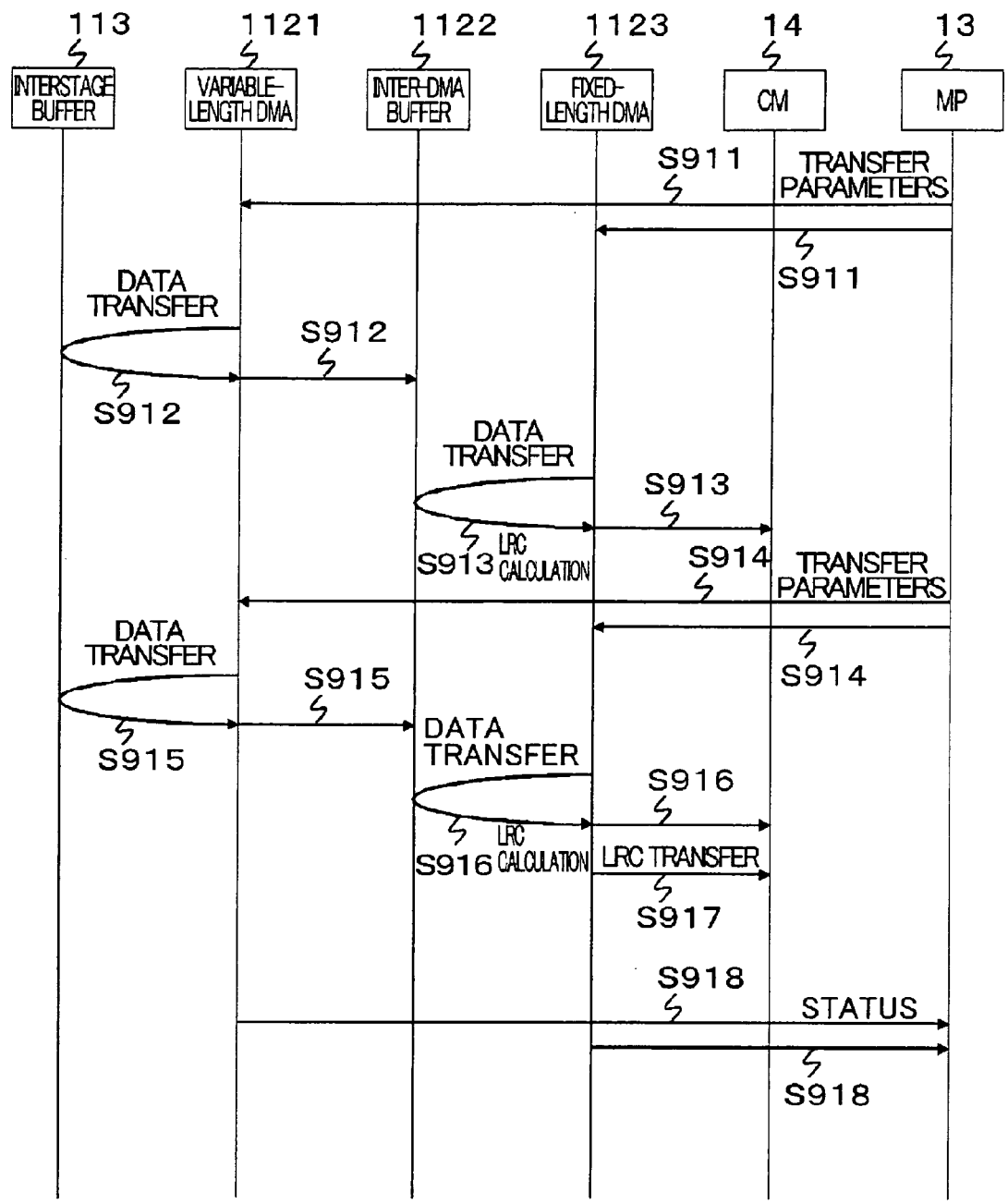

[Fig. 10]
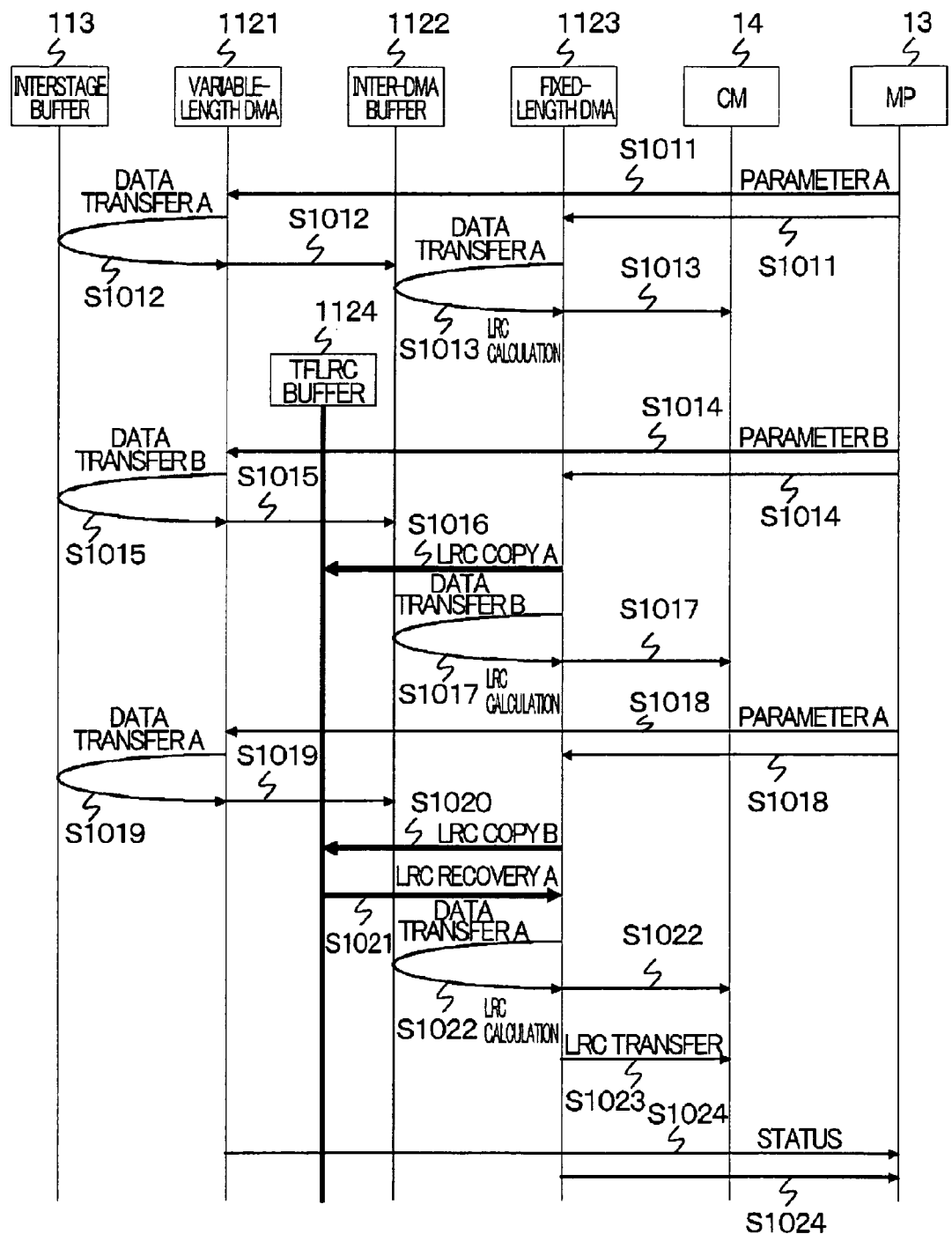

[Fig. 11]
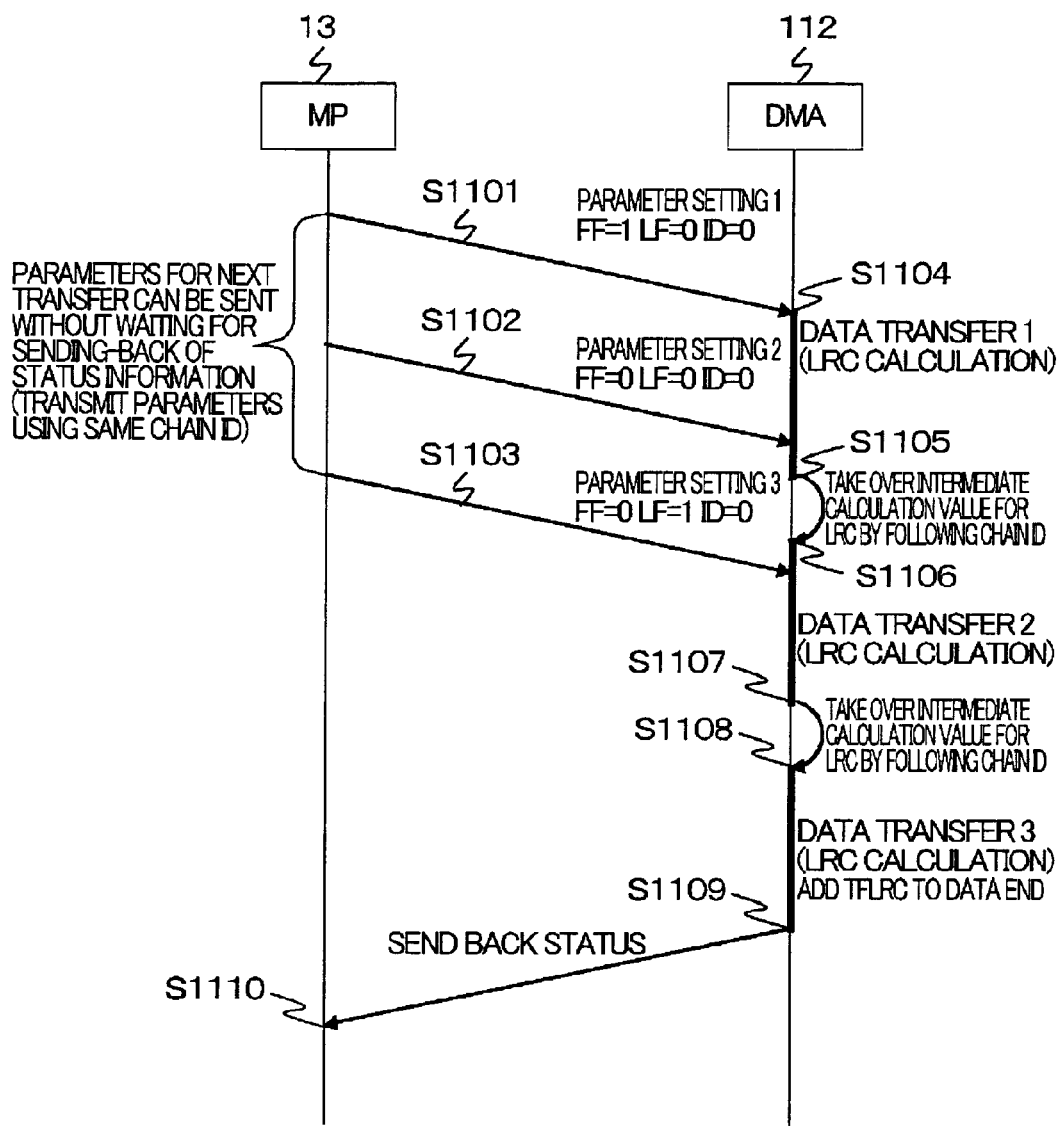

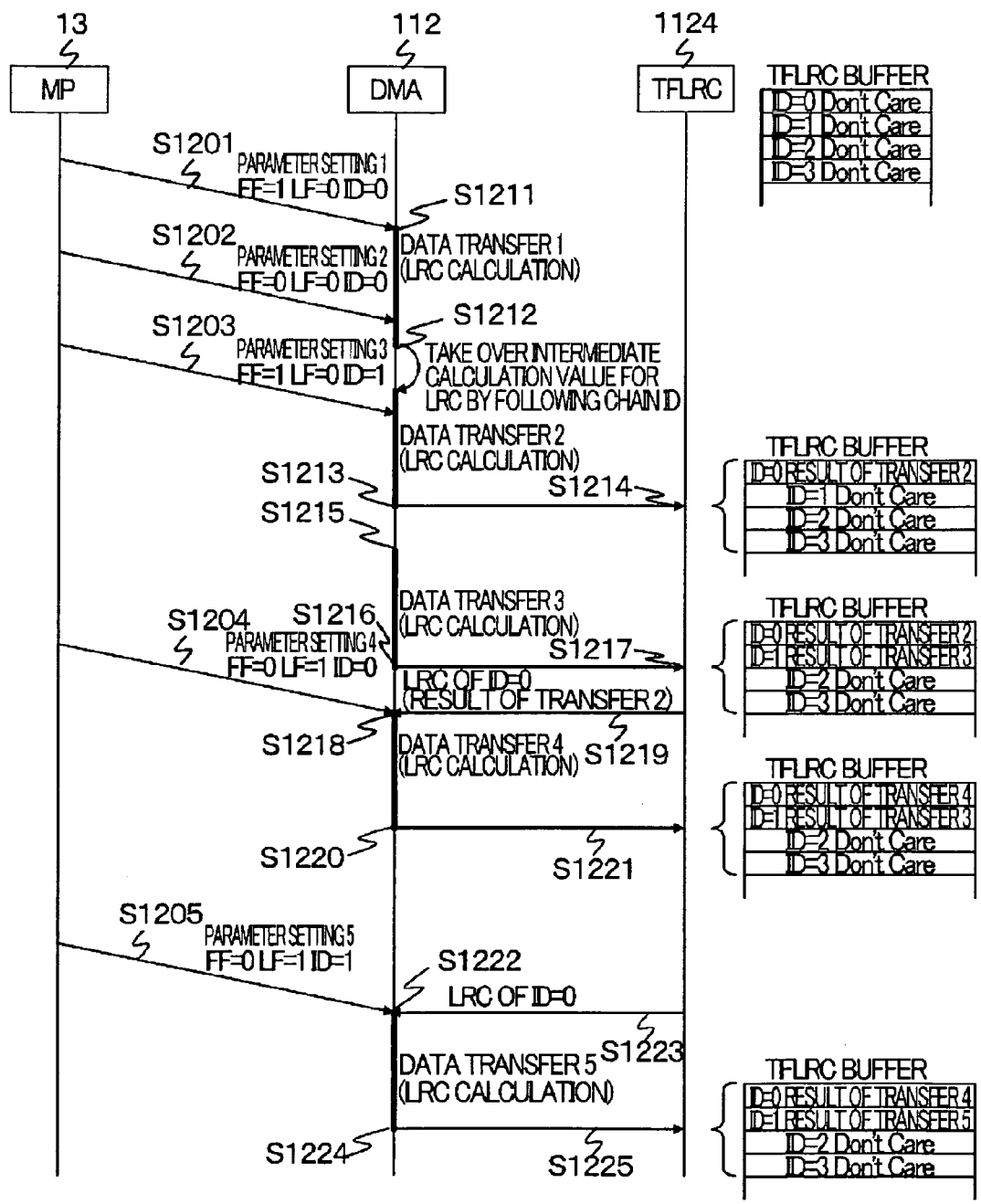
[Fig. 12]

[Fig. 13]
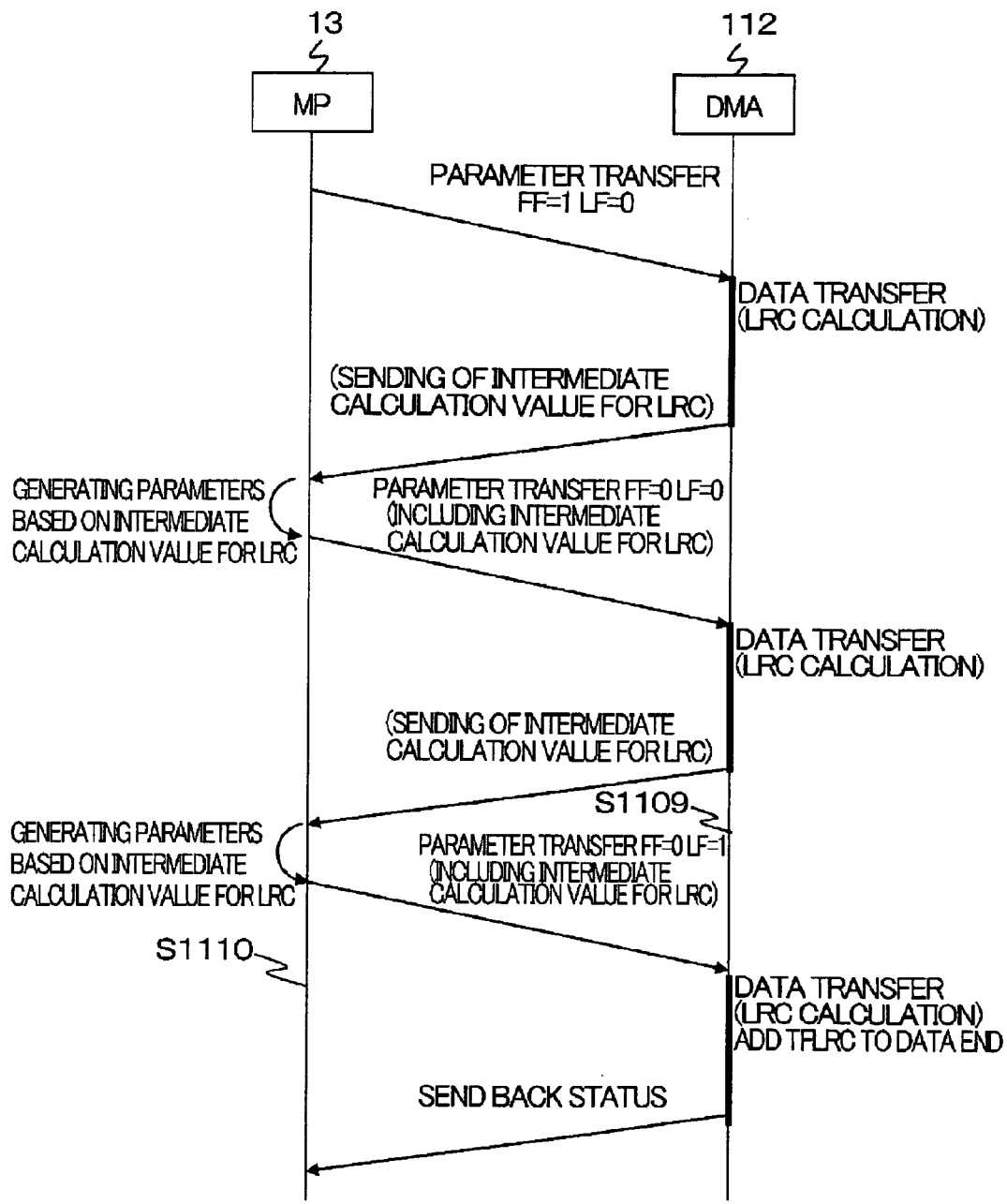

[Fig. 14A]
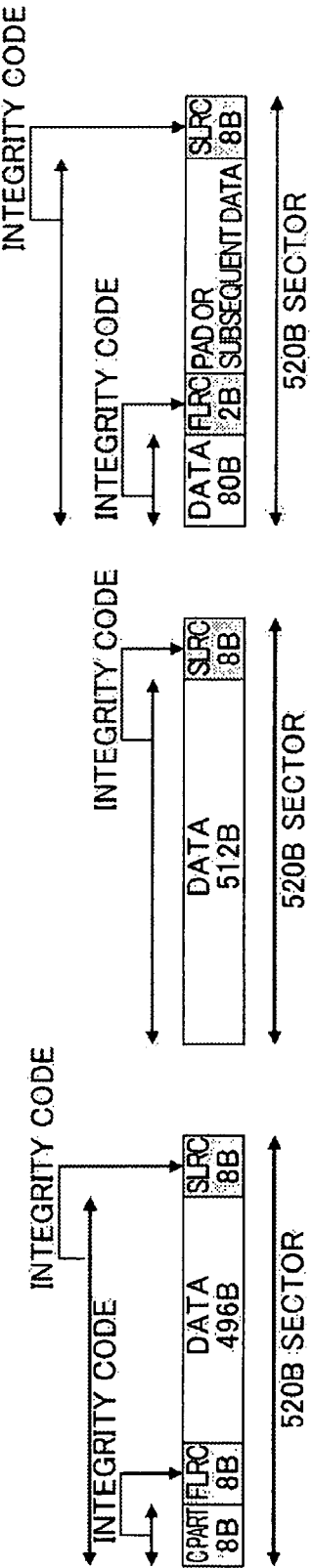

[Fig. 14B]
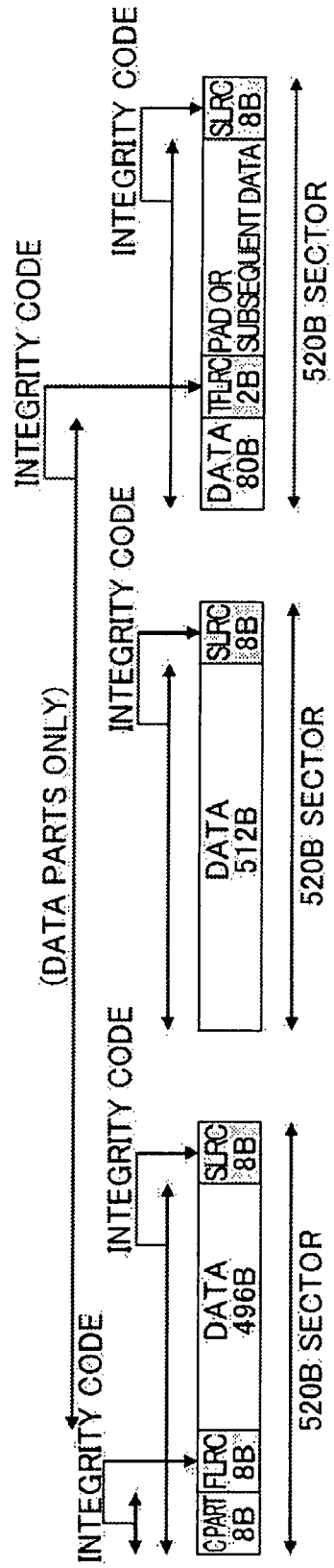

[Fig. 14C]
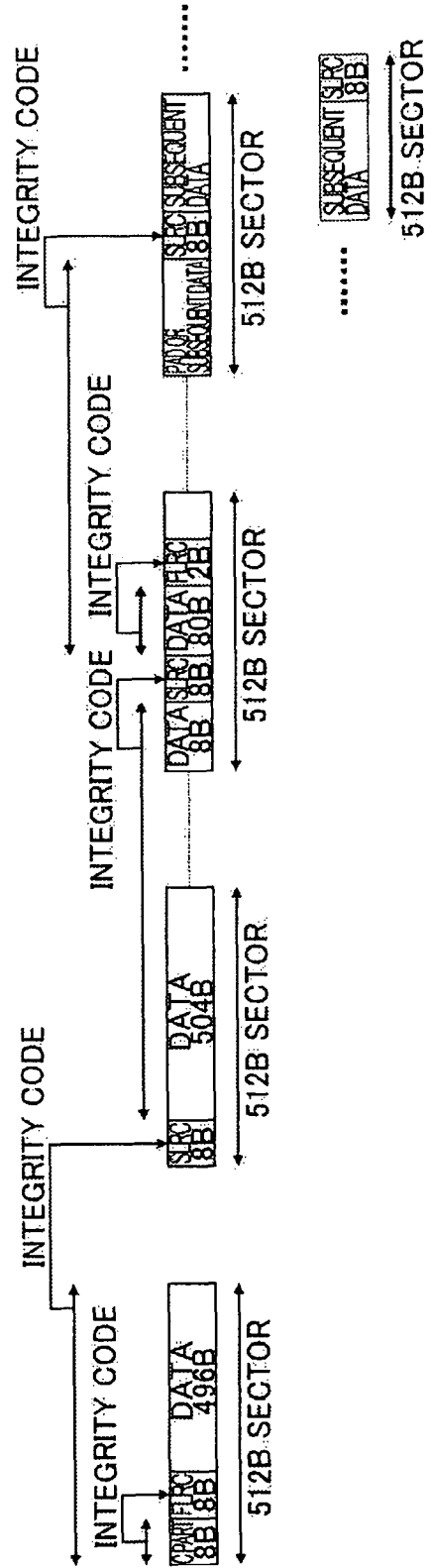

[Fig. 14D]
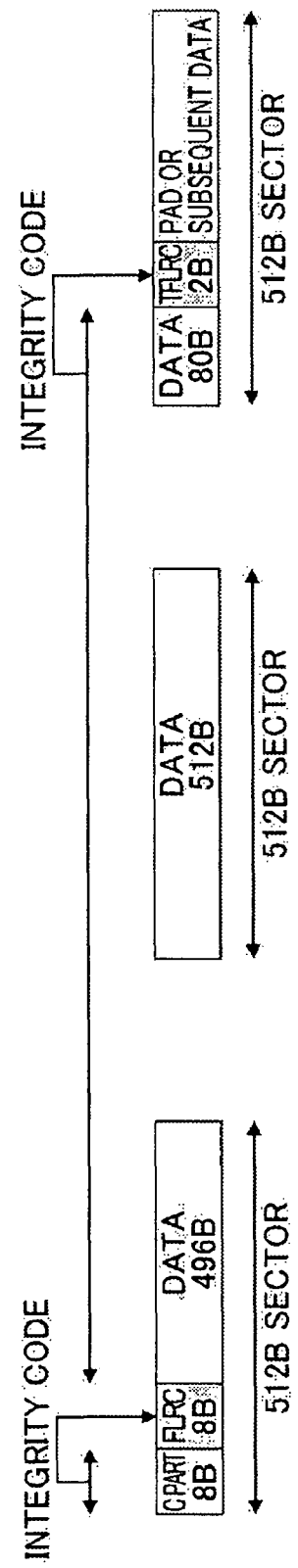

[Fig. 15A]
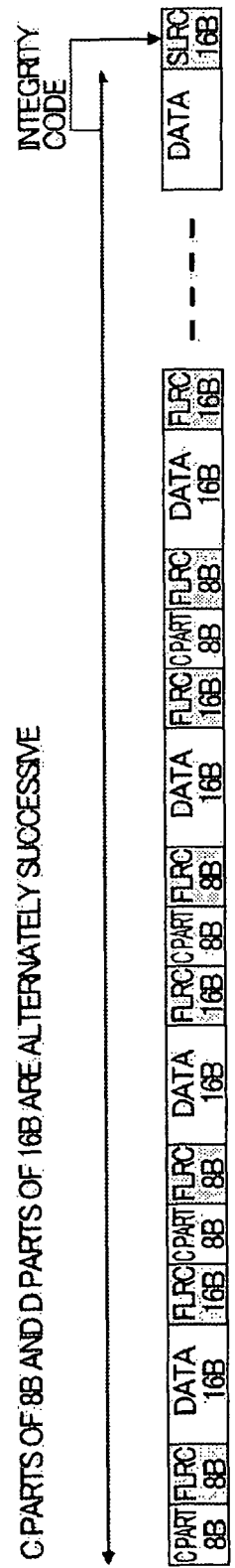

[Fig. 15B]
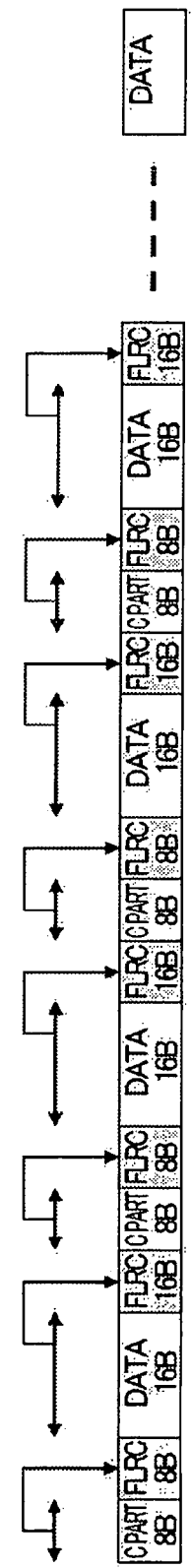

STORAGE APPARATUS AND DATA INTEGRITY ASSURANCE METHOD

TECHNICAL FIELD

The present invention relates to a storage apparatus and a data integrity assurance method, especially to a technique for reliably detecting erroneous data.

BACKGROUND ART

As a method for improving reliability of a storage apparatus, there has been known a method of adding an integrity code such as an LRC (Longitudinal Redundancy Check) code to data to be stored in a storage device such as a hard disk drive. For example, Patent Citation 1 discloses that an integrity code for each data block to be stored in the storage device is calculated on a block basis.

In this regard, in a storage apparatus that receives an I/O request for variable-length data sent from a host computer such as a mainframe, the variable-length data is converted into one or more fixed-length data sets each equivalent to a sector size of a hard disk drive, and the fixed-length data sets are stored into the hard disk drive after an integrity code is added to each fixed-length data set.

[Patent Citation 1]
Japanese Patent Application Laid-open Publication No. 2005-84799

DISCLOSURE OF INVENTION

Technical Problem

However, such a method of adding an integrity code to each fixed-length data set has the following problem that, if any of the aforementioned fixed-length data sets and an integrity code added thereto both fail to be updated and are incorrectly written due to a physical failure or the like, such erroneous data cannot be detected, for example.

The present invention has been made in light of the aforementioned problem, and an object thereof is to provide a storage apparatus and a data integrity assurance method that are capable of reliably detecting erroneous data.

Technical Solution

To solve the aforementioned and other problems, a storage apparatus according to an aspect of the present invention includes: a channel control unit that communicates with a host computer; a disk control unit that controls a hard disk drive; and a cache memory accessible by the channel control unit and the disk control unit The channel control unit, upon receiving an I/O request from the host computer, sends or receives data to or from the disk control unit via the cache memory, the data to be written to or to be read from the hard disk drive in accordance with the I/O request. The channel control unit includes a variable-length DMA (Direct Memory Access) that performs data transfer of variable-length data sent or received to or from the host computer in accordance with the I/O request, a fixed-length DMA that performs data transfer of fixed-length data to and from the cache memory, and a buffer intervening between the variable-length DMA and the fixed-length DMA. The fixed-length DMA, in performing the data transfer of the fixed-length data to the cache memory, divides the variable-length data into a plurality of sets of the fixed-length data each having a data size equivalent to a unit size of data managed in the cache memory, and adds a first integrity code to a last fixed-length data set of the fixed-length data sets generated by the division, the first integrity code being generated based on the variable-length data in its entirety.

As described above, according to the present invention, in storing fixed-length data sets based on variable-length data into the cache memory, the fixed-length DMA adds a first integrity code generated based on the entire variable-length data to the last one of the fixed-length data sets. Thus, if any of the aforementioned fixed-length data sets and an integrity code added thereto both fail to be updated and thus are incorrectly written due to a physical failure or the like, such data error can be detected by using the first integrity code. Note that, this addition of the first integrity code allows the channel control unit, the cache memory, the disk control unit, the hard disk drive and the like to detect data errors.

A storage apparatus according to another aspect of the present invention includes a microprocessor that performs processing regarding data transfer among the channel control unit, the disk control unit and the cache memory. The microprocessor sets transfer parameters for transferring the variable-length data to the cache memory on the variable-length DMA and the fixed-length DMA, respectively. The fixed-length DMA stores an intermediate calculation value for the first integrity code generated in the data transfer corresponding to each of the transfer parameters, and generates the first integrity code based on the entire variable-length data by taking over the intermediate calculation value generated in the data transfer corresponding to each of the transfer parameters, when the data transfer of certain variable-length data to the cache memory is performed by setting the transfer parameters a plurality of times.

According to the present invention, even if the data transfer of variable-length data to the cache memory is performed by setting the transfer parameters multiple times, the first integrity code can be generated based on the entire variable-length data.

In a storage apparatus according to another aspect of the present invention, a chain ID which is an identifier assigned to each CCW (Channel Command Word) chain is provided to the transfer parameter that is set on the fixed-length DMA, and the fixed-length DMA stores the intermediate calculation value for each of the chain IDs, and generates the first integrity code based on the entire variable-length data for each of the chain IDs by taking over the intermediate calculation value generated in the data transfer corresponding to each of the transfer parameters.

According to the present invention, for each CCW chain, the first integrity code can be properly generated based on the entire variable-length data.

In a storage apparatus according to another aspect of the present invention, the data size equivalent to the unit size of data managed in the cache memory is a data size equivalent to a sector size of a hard disk drive of FC (Fibre Channel) type, and the fixed-length DMA generates a second integrity code based on the fixed-length data set for each of the fixed-length data sets. The disk control unit
- stores data into each sector of the hard disk drive of the storage apparatus, the data to which the second integrity code is added while the first integrity code is further added to the data to be stored in a sector in which the last fixed-length data set is written, when the hard disk drive is a hard disk drive of FC type, and
- stores data into each sector of the hard disk drive of the storage apparatus, the data to which the second integrity code is not added but the first integrity code is added to be stored in the sector in which the last fixed-length data set is written, when the hard disk drive is a hard disk drive of SATA (Serial Advanced Technology Attachment) type.

Here, the data size equivalent to the unit size of data managed in the cache memory is a data size equivalent to a sector size of a hard disk drive of FC type, for example. Suppose that the hard disk drive into which data is actually written is of SATA type, though. In this case, if both the first integrity code (TFLRC) and the second integrity code (SLRC) are written into a data set to be written into each sector, this makes storage positions of integrity codes different from one sector to another, for example, and thus data formats different from one sector to another. Accordingly, the structure of software to be executed by the channel control unit, the disk control unit and the like is complicated, and thus maintainability of the storage apparatus is deteriorated.

However, according to the present invention, no second integrity code but only the first integrity code is added to data if the hard disk drive is of SATA type, so that data formats of the respective sectors can correspond to one another. Accordingly, it is possible to add the first integrity code to data to be stored in the hard disk drive without deteriorating maintainability of the storage apparatus.

In a storage apparatus according to another aspect of the present invention, the variable-length data is data of CKD (Count Key Data architecture) format, and the fixed-length DMA newly generates the fixed-length data set for storing therein the first integrity code when an end address of a D part of the variable-length data is equal to the end address of the last fixed-length data set.

According to the present invention, even when the end address of the D part of variable-length data is equal to the end address of the last fixed-length data set, that is, even when the last data set of the D part fits within the size of the fixed-length data set, the fixed-length DMA automatically generates a new fixed-length data set for storing therein the first integrity code. Accordingly, even in the above case, the first integrity code can be added to the data without fail.

Other problems and solutions thereto disclosed in this application will be made clear in the section of best mode for carrying out the invention with reference to the drawings.

According to the present invention, even if any of the aforementioned fixed-length data sets and an integrity code added thereto both fail to be updated and are incorrectly written due to a physical failure or the like, such erroneous data can be reliably detected.

BRIEF DESCRIPTION OF THE DRAWINGS

FIG. 1 shows a configuration of a storage apparatus 10.

FIG. 2 shows main components of each CHA 11.

FIG. 3 is a flow chart illustrating processing performed among the CHA 11, a MP 13 and a CM 14 upon receipt of an I/O request.

FIG. 4 shows a structure of each record of CKD format data.

FIG. 5 shows an example of a transfer parameter that is set on a variable-length DMA 1121.

FIG. 6 shows an example of a transfer parameter that is set on a fixed-length DMA 1123.

FIG. 7A illustrates a first scheme (scheme to assure data integrity).

FIG. 7B illustrates a second scheme (scheme to assure data integrity).

FIG. 8A illustrates a method of generating a first integrity code (TFLRC) employed when variable-length data 711 includes just a single record.

FIG. 8B illustrates a method of generating a first integrity code (TFLRC) employed when the end address of a D part 413 of the variable-length data 711 is equal to the end address of the last fixed-length data set 712.

FIG. 8C illustrates a method of adding a first integrity code (TFLRC) to a record if the record satisfies a predetermined condition.

FIG. 9 is a flow chart illustrating how the fixed-length DMA 1123 adds a first integrity code (TFLRC) to transferred data.

FIG. 10 is a flow chart illustrating how the fixed-length DMA 1123 adds a first integrity code (TFLRC) to transferred data.

FIG. 11 is a flow chart illustrating how an intermediate calculation value for LRC is taken over from one transfer parameter to another by using a chain ID.

FIG. 12 is another flow chart illustrating how an intermediate calculation value for LRC is taken over from one transfer parameter to another by using chain IDs.

FIG. 13 shows how an intermediate calculation value for LRC is taken over if the MP 13 manages the intermediate calculation value for LRC.

FIG. 14A shows a data storage form (data format) employed when data is stored in a hard disk drive 171 of FC type after integrity codes are added to the data by the first scheme.

FIG. 14B shows a data storage form (data format) employed when data is stored in the hard disk drive 171 of FC type after integrity codes are added to the data by the second scheme.

FIG. 14C shows a data storage form (data format) employed when data is stored in the hard disk drive 171 of SATA type after integrity codes are added to the data by the first scheme.

FIG. 14D shows a data storage form (data format) employed when data is stored in the hard disk drive 171 of SATA type after integrity codes are added to the data by the second scheme.

FIG. 15A illustrates a process of generating integrity codes for a sector by the first scheme when data in the sector is being partially rewritten.

FIG. 15B illustrates a process of generating integrity codes for a sector by the second scheme when data in the sector is being partially rewritten.

EMBODIMENTS OF INVENTION

Hereinafter, an embodiment will be described. FIG. 1 shows a configuration of a storage apparatus 10 to be described as an embodiment. As shown in FIG. 1, the storage apparatus 10 includes: one or more channel adaptors (hereinafter, referred to as CHAs 11 (CHA: CHannel Adaptor)); one or more disk adaptors (hereinafter, referred to as DKAs 12 (DKA: DisK Adaptor)); at least one control processor (hereinafter, referred to as MP 13 (MP: Micro Processor)); a cache memory (hereinafter, referred to as CM 14 (CM: Cache Memory)); a shared memory (hereinafter, referred to as SM 15 (SM: Shared Memory); a switch 16; and a storage device 17.

Each CHA 11 receives an I/O request (such as a data write request or a data read request) sent by any of host computers 2, and sends, to one of the DKAs 12, an I/O command (a data read command or a data write command) according to the received I/O request. In processing the I/O command, data (data read from the storage device 17 or data to be written in the storage device 17) transferred between CHA 11 and DKA 12 is delivered via the CM 14. Upon performing processing according to the I/O request received from the host computer 2, the CHA 11 sends the host computer 2 a response to the I/O request (such as read data, a data read completion report or a data write completion report).

The host computers 2 each are an information apparatus (computer), such as a mainframe, which sends the storage apparatus 10 an I/O request for variable-length data (of CKD (Count Key Data architecture) format, for example). The host computers 2 are coupled to the storage apparatus 10 through, for example, a special purpose line, a LAN (Local Area Network), a SAN (Storage Area Network), the Internet or a public communication network. Each host computer 2 and the storage apparatus 10 communicate with each other according to a protocol such as FICON (registered trademark) (Fibre Connection), ESCON (registered trademark) (Enterprise System Connection), ACONARC (registered trademark) (Advanced Connection Architecture) or FIBARC (registered trademark) (Fibre Connection Architecture).

Upon receipt of the I/O command send by one of the CHAs 11, each DKA 12 reads data from the storage device 17 or writes data into the storage device 17. In addition, the DKA 12 performs staging (reading data from the storage device 17 to store into the CM 14) or destaging (writing, into the storage device 17, data stored in the CM 14).

As the MP 13, a CPU, an MPU or a DMA (Direct Memory Access) is used, for example. The MP 13, which is hardware separate from the CHAs 11, the DKAs 12 and the CM 14, performs processing-related to data transfer among the CHAs 11, the DKAs 12 and the CM 14 for the purpose of speeding up the data transfer and load balancing.

As the CM 14, a RAM (Random Access Memory) enabling high-speed access is used, for example. The CM 14 stores therein data to be written in the storage device 17 (hereinafter, referred to as to-be-written data), and data read from the storage device 17 (hereinafter, referred to as read data), for example. The SM 15 stores therein information used for control of the storage apparatus 10, for example.

The storage device 17 includes hard disk drives (HDDs) 171. The hard disk drives 171 are controlled according to a control method such as RAID (Redundant Arrays of Inexpensive (or Independent) Disks) (using RAID levels 0, 1, 5, 6 and so on, for example). The storage device 17 provides storage areas in units of logical device LDEVs (Logical Devices), for example. Here, the logical device LDEV is formed of a storage area provided according to RAID (storage area for a RAID group), for example. Note that the storage device 17 may alternatively include other storage media such as semiconductor storage devices (SSDs).

The switch 16 is a high-speed cross bar switch (Cross Bar Switch), for example. Communications via the switch 16 are performed according to a protocol such as Fibre Channel, iSCSI (Internet Small Computer System Interface) or TCP/IP.

FIG. 2 shows main components of each CHA 11. The CHA 11 includes one or more protocol controllers 111, a DMA 112 and an interstage buffer 113. As each of the protocol controllers 111 and the DMA 112, a customized LSI (Large Scale Integration) is used, for example. As the interstage buffer 113, a DRAM (Dynamic Random Access Memory) is used, for example.

Each protocol controller 111 converts formats of data transmitted and received between one of the host computers 2 and the storage apparatus 10. Specifically, the protocol controller 111 converts between: a data format according to the protocol (such as FICON or ESCON) employed in communications between each host computer 2 and the storage apparatus 10; and a data format employed in the storage apparatus 10.

The DMA 112 transfers data between the CHA 11 and the MP 13 as well as between the CHA 11 and the CM 14. As shown in FIG. 2, the DMA 112 includes a variable-length DMA 1121, an inter-DMA buffer 1122, a fixed-length DMA 1123 and a TFLRC buffer 1124. The variable-length DMA 1121 transfers variable-length data between each host computer 2 and the inter-DMA buffer 1122. The fixed-length DMA 1123 transfers fixed-length data between the inter-DMA buffer 1122 and the MP 13 or the CM 14. The inter-DMA buffer 1122 stores therein data transferred between the variable-length DMA 1121 and the fixed-length DMA 1123. The TFLRC buffer 1124 stores therein intermediate calculation values obtained during calculation of a first integrity code (TFLRC) to be described later.

The interstage buffer 113 stores therein data transferred between each protocol controller 111 and the variable-length DMA 1121. As the interstage buffer 113, a DRAM is used, for example.

Next, with reference to FIG. 3, description will be given of processing performed among the CHA 11, the MP 13 and the CM 14 in accordance with an I/O request sent by any of the host computers 2. FIG. 3 is a flow chart illustrating processing performed among the CHA 11, the MP 13 and the CM 14 when the CHA 11 converts variable-length data into fixed-length data and transfers the fixed-length data to the CM 14 upon receipt of an I/O request (data write request) of the variable-length data (of CKD format) sent by the host computers 2. Note that the letter "S" prefixed to each reference numeral in the following description represents "step."

As shown in FIG. 3, in the aforementioned data transfer, the MP 13 firstly sets, on the DMA 112, transfer parameters for storing the C part of the CKD format data into the CM 14 (S311).

FIG. 4 shows a structure of each record of CKD format data. As shown in FIG. 4, each record of CKD format data includes a C part 411 (Count part), a K part 412 (Key part) and a D part 413 (Data part). In the C part 411, format information on the to-be-transferred data is defined. In the K part 412, information on applications running on the host computers 2 is defined. In the D part 413, data (data read from the storage device 17 or data to be written into the storage device 17) are defined.

When the MP 13 sets the transfer parameters on the DMA 112, the DMA 112 reads the C part 411 from the interstage buffer 113, and transfers the read C part 411 to the MP 13 (S312). Upon receipt of the C part 411 from the DMA 112, the MP 13 transfers the C part 411 to the CM 14 (S313). Thereby, the C part 411 is stored in the CM 14.

Then, the MP 13 sets, on the DMA 112, transfer parameters for storing the K part 412 and the D part 413 of the CKD format data into the CM 14 (S314). When the transfer parameters are set on the DMA 112, the DMA 112 reads the K part 412 and the D part 413 from the interstage buffer 113, and transfers the read K part 412 and D part 413 to the MP 13 (S315). Upon receipt of the K part 412 and the D part 413 from the DMA 112, the MP 13 transfers the K part 412 and the D part 413 to the CM 14. Thereby, the K part 412 and the D part 413 are stored in the CM 14.

Upon completion of transfer of all the C part 411, the K part 412 and the D part 413, the DMA 112 sends the MP 13 status information indicating transfer results (S316).

Here, in S311 and S314 of FIG. 3, the MP 13 sets a transfer parameter on each of the variable-length DMA 1121 and the fixed-length DMA 1123, which are components of the DMA 112. FIG. 5 shows an example of a transfer parameter that is set on the variable-length DMA 1121, while FIG. 6 shows an example of a transfer parameter that is set on the fixed-length DMA 1123.

<Data Integrity Assurance Scheme>

The storage apparatus 10 assures integrity of data stored in the storage device 17 and the CM 14 by using error correcting codes (such as LRCs) in the aforementioned components of the fixed-length DMAs 1123, the switch 16, the CM 14, the DKAs 12 and the storage device 17.

The storage apparatus 10 uses first and second schemes to assure data integrity. In the first scheme, the storage apparatus 10 adds a second integrity code (SLRC) to each fixed-length data set having a size equivalent to a sector size of the hard disk drives 171. Meanwhile, in the second scheme, the storage apparatus 10 adds a first integrity code (TFLRC) to the entire transferred data of CKD format (the entire data that includes one or more records each being a combination of the C part 411, the K part 412 and the D part 413).

FIG. 7A illustrates the first scheme. In the first scheme, the fixed-length DMA 1123 divides variable-length data 711 into multiple fixed-length data sets 712, and adds a second integrity code (SLRC) to each of these fixed-length data sets 712. In this event, the fixed-length DMA 1123 adds, to the last fixed-length data set 712 generated by the division, an integrity code (FLRC) based on the last fixed-length data set 712 (a fractional data set of the variable-length data 711), and a second integrity code (SLRC) generated based on the entire combination of: this last data set; the integrity code (FLRC) added thereto; and padding data (PAD data (PAD: PADding) consisting of 0s, for example) added to make the last data set have the same size as each of the other fixed-length data sets 712.

FIG. 7B illustrates the second scheme. As shown in FIG. 7B, in the second scheme, the fixed-length DMA 1123 adds a second integrity code (SLRC) to each fixed-length data set 712. Additionally, the storage apparatus 10 adds, to the last fixed-length data set 712, a first integrity code (TFLRC) generated based on the entire variable-length data 711. With the second scheme, even if, for example, any of the fixed-length data sets 712 and the second integrity code (SLRC) added thereto both fail to be updated and are incorrectly written due to a physical failure or the like, such a data error can be detected by using first integrity codes (TFLRCs).

FIG. 8A illustrates a method of generating a first integrity code (TFLRC) employed when the variable-length data 711 sent by any of the host computers 2 includes just a single record. In such a case where the variable-length data 711 includes just a single record, the MP 13 sets, to 1, a "TF" bit of the transfer parameter on the fixed-length DMA 1123 shown in FIG. 6 (a TFLRC mode is enabled). The fixed-length DMA 1123 adds a first integrity code (TFLRC) to the last fixed-length data set 712 by detecting if a "LF" bit therefor is 1.

FIG. 8B illustrates a method of generating a first integrity code (TFLRC) employed when the end address of the D part 413 of the variable-length data 711 is equal to the end address of the last fixed-length data set 712. In this case, the fixed-length DMA 1123 newly generates a fixed-length data set 712 for storing therein the first integrity code (TFLRC).

Note that, if the variable-length data 711 sent by any of the host computers 2 includes multiple successive records, the MP 13 cannot set, to ON, the "LF" bit of the transfer parameter on the fixed-length DMA 1123 for each record other than the last record. This makes it impossible to add a first integrity code (TFLRC) to each record other than the last record. Accordingly, the fixed-length DMA 1123 adds a first integrity code (TFLRC) to a record if the record satisfies any of predetermined conditions such as: (1) the "LF" bit is 1; (2) the to-be-transferred record has a length less than the sector size; and (3) the to-be-transferred record has a length equal to the sector size, as shown in FIG. 8C.

FIG. 9 is a flow chart illustrating how the fixed-length DMA 1123 adds a first integrity code (TFLRC) to data while the MP 13 transfers the data to the CM 14. Hereinbelow, the description thereof will be given with reference to FIG. 9.

As shown in FIG. 3, in order to transfer data to the CM 14, the MP 13 firstly sets transfer parameters respectively on the variable-length DMA 1121 and the fixed-length DMA 1123 (S911).

When the transfer parameters are set, the variable-length DMA 1121 reads data from the interstage buffer 113 in accordance with the transfer parameter that is set thereon, and transfers the read data to the inter-DMA buffer 1122 (S912). The fixed-length DMA 1123 reads data stored in the inter-DMA buffer 1122 in accordance with the transfer parameter that is set thereon, converts the read data to a fixed-length data set 712, and transfers the fixed-length data set 712 to the CM 14 (S913). In this step, the fixed-length DMA 1123 also calculates an LRC based on the transferred data set, and keeps (stores) therein the calculated LRC as an intermediate calculation value.

Then, the MP 13 sets transfer parameters that are unused for processing respectively on the variable-length DMA 1121 and the fixed-length DMA 1123 (S914). When the transfer parameters are set, the variable-length DMA 1121 reads data from the interstage buffer 113 in accordance with the transfer parameter that is set thereon, and transfers the data to the inter-DMA buffer 1122 (S915). The fixed-length DMA 1123 reads data stored in the inter-DMA buffer 1122 in accordance with the transfer parameter that is set thereon, converts the read data to a fixed-length data set 712, and transfers the fixed-length data set 712 to the CM 14 (S916). In this step, the fixed-length DMA 1123 also calculates an LRC by using the intermediate calculation value for LRC kept (stored) in S913. If the fixed-length DMA 1123 transfers the last fixed-length data set 712 in S916, the fixed-length DMA 1123 adds, to this fixed-length data set 712 to be transferred to the CM 14, the LRC calculated in S916 as a first integrity code (TFLRC) (S917).

Upon completion of data transfer in accordance with the transfer parameter, each of the variable-length DMA 1121 and the fixed-length DMA 1123 sends the MP 13 status information indicating transfer results (S918).

FIG. 10 is a flow chart illustrating how the fixed-length DMA 1123 adds a first integrity code (TFLRC) to data while the MP 13 transfers the data to the CM 14 by multiplex data transfer. Hereinbelow, the description thereof will be given with reference to FIG. 10.

As in the foregoing case, the MP 13 firstly sets transfer parameters A respectively on the variable-length DMA 1121 and the fixed-length DMA 1123 (S1011). When the transfer parameters A are set, the variable-length DMA 1121 reads data from the interstage buffer 113 in accordance with the transfer parameter A that is set thereon, and transfers the read data to the inter-DMA buffer 1122 (S1012). The fixed-length DMA 1123 reads data stored in the inter-DMA buffer 1122 in accordance with the transfer parameter A that is set thereon, converts the read data to a fixed-length data set 712, and transfers the fixed-length data set 712 to the CM 14 (S1013). In this step, the fixed-length DMA 1123 also calculates an LRC based on the data set transferred to the CM 14 in accordance with the transfer parameter A, and keeps (stores) therein the calculated LRC as an intermediate calculation value.

Then, the MP 13 sets transfer parameters B respectively on the variable-length DMA 1121 and the fixed-length DMA 1123 (S1014). When the transfer parameters B are set, the variable-length DMA 1121 reads data from the interstage buffer 113 in accordance with the transfer parameter B that is set thereon, and transfers the read data to the inter-DMA buffer 1122 (S1015). Meanwhile, the fixed-length DMA 1123 copies, to the TFLRC buffer 1124, the LRC calculated in S1013 based on the data set transferred in accordance with the transfer parameter A (S1016).

Then, the fixed-length DMA 1123 reads data stored in the inter-DMA buffer 1122 in accordance with the transfer parameter B that is set thereon, converts the read data to a fixed-length data set 712, and transfers the fixed-length data set 712 to the CM 14 (S1017). In this step, the fixed-length DMA 1123 also calculates an LRC based on the data transferred to the CM 14 in accordance with the transfer parameter B, and keeps (stores) therein the calculated LRC as an intermediate calculation value.

Then, the MP 13 sets transfer parameters A that are unused for processing respectively on the variable-length DMA 1121 and the fixed-length DMA 1123 (S1018). After that, the variable-length DMA 1121 reads data from the interstage buffer 113 in accordance with the transfer parameter A that is set thereon, and transfers the read data to the inter-DMA buffer 1122 (S1019). Meanwhile, the fixed-length DMA 1123 copies, to the TFLRC buffer 1124, the LRC calculated in S1017 for the data transferred in accordance with the transfer parameter B (S1020). In addition, the fixed-length DMA 1123 reads the LRC for the transfer parameter A having been copied to the TFLRC buffer 1124 in S1016 (S1021).

Then, the fixed-length DMA 1123 reads data stored in the inter-DMA buffer 1122 in accordance with the transfer parameter A that is set thereon in S1018, converts the read data to a fixed-length data set 712, and transfers the fixed-length data set 712 to the CM 14 (S1022). In this step, the fixed-length DMA 1123 also calculates an LRC by using the intermediate calculation value for LRC having been read in S1021. If the fixed-length DMA 1123 transfers the last fixed-length data set 712 in S1022, the fixed-length DMA 1123 adds, to this fixed-length data set 712 to be transferred to the CM 14, the LRC calculated in S1022 as a first integrity code (TFLRC) (S1023).

Note that, a first integrity code (TFLRC) for the transfer parameter B is added as in the case of the transfer parameter A. Upon completion of data transfer for each transfer parameter, each of the variable-length DMA 1121 and the fixed-length DMA 1123 sends to the MP 13 status information indicating transfer results (S1024).

Here, in FIGS. 9 and 10, an intermediate calculation value for LRC is taken over from one transfer parameter to another by using an identifier (hereinafter, referred to as chain ID) assigned to each CCW chain. FIG. 11 is a flow chart illustrating how an intermediate calculation value for LRC is taken over from one transfer parameter to another by using a chain ID during data transfer. Hereinbelow, the description thereof will be given with reference to FIG. 11.

As shown in FIG. 11, the MP 13 can set transfer parameters on the DMA 112 without waiting for the DMA 112 to send back status information (S1101 to S1103). Note that FIG. 11 shows the case where the MP 13 sets, on the DMA 112, transfer parameters having the same chain ID (chain ID=0) three times.

As shown in FIG. 11, in the transfer parameter that is set on the fixed-length DMA 1123 in a first round of transfer parameter setting (parameter setting 1 (S1101)), an "FF" bit is 1 while the "LF" bit is 0. Meanwhile, in the transfer parameter that is set on the fixed-length DMA 1123 in a second round of transfer parameter setting (parameter setting 2 (S1102)), the "FF" bit and the "LF" bit are 0. In the transfer parameter that is set on the fixed-length DMA 1123 in a third round of transfer parameter setting (parameter setting 3 (S1103)), the "FF" bit is 0 while the "LF" bit is 1.

Upon completion of the parameter setting 1 (S1101), the DMA 112 starts data transfer 1 (S1104). During execution of the data transfer 1, which completes in S1105, the parameter setting 2 (S1102) is performed. Upon completion of the data transfer 1, the DMA 112 keeps (stores) a current intermediate calculation value for LRC (S1105).

Then, the DMA 112 starts data transfer 2 (S1106) corresponding to the parameter setting 2 (S1102). In this step (S1106), the DMA 112 also takes over the intermediate calculation value for LRC kept after the data transfer 1 corresponding to the parameter setting 1 (S1101) in which the chain ID is shared with the parameter setting 2. Note that, as shown in FIG. 11, the parameter setting 3 (S1103) is performed during execution of the data transfer 2. Upon completion of the data transfer 2 (S1107), the DMA 112 keeps (stores) a current intermediate calculation value for LRC.

Then, the DMA 112 starts data transfer 3 (S1108) corresponding to the parameter setting 3 (S1103). In this step, the DMA 112 also takes over the intermediate calculation value for LRC kept after the data transfer 2 corresponding to the parameter setting 2 in which the chain ID is shared with the parameter setting 3. Upon completion of the data transfer 3, the DMA 112 adds a first integrity code (TFLRC) to the last fixed-length data set 712, and sends status information to the MP 13 (S1109). Then, the MP 13 receives the status information.

FIG. 12 is a flow chart illustrating how an intermediate calculation value for LRC is taken over from one transfer parameter to another by using chain IDs during data transfer. FIG. 11 shows the case where a single chain ID is used, while FIG. 12 shows the case where multiple chain IDs are used. Hereinbelow, the description thereof will be given with reference to FIG. 12.

As in the case of FIG. 11, the MP 13 can set transfer parameters on the DMA 112 without waiting for the DMA 112 to send back status information (S1201 to S1205).

As shown in FIG. 12, in the transfer parameter that is set on the fixed-length DMA 1123 in a first round of transfer parameter setting (parameter setting 1 (S1201)), the "FF" bit, the "LF" bit and the chain ID are 1, 0, 0, respectively. Meanwhile, in the transfer parameter that is set on the fixed-length DMA 1123 in a second round of transfer parameter setting (parameter setting 2 (S1202)), the "FF" bit, the "LF" bit and the chain ID are 0. In the transfer parameter that is set on the fixed-length DMA 1123 in a third round of transfer parameter setting (parameter setting 3 (S1203)), the "FF" bit, the "LF" bit and the chain ID are 1, 0, 1, respectively. In the transfer parameter that is set on the fixed-length DMA 1123 in a fourth round of transfer parameter setting (parameter setting 4 (S1204)), the "FF" bit, the "LF" bit and the chain ID are 0, 1, 0, respectively. In the transfer parameter that is set on the fixed-length DMA 1123 in a fifth round of transfer parameter setting (parameter setting 5 (S1205)), the "FF" bit, the "LF" bit and the chain ID are 0, 1, 1, respectively.

As described above, in the example case shown in FIG. 12, a chain ID is shared among the parameter setting 1 (S1201), the parameter setting 2 (S1202) and the parameter setting 4 (S1204) while another chain ID is shared between the parameter setting 3 (S1203) and the parameter setting 5 (S1205)

Upon completion of the parameter setting 1 (S1201), the DMA 112 starts data transfer 1 (S1211). During execution of the data transfer 1, which completes in S1212, the parameter setting 2 (S1202) is performed. Upon completion of the data transfer 1, the DMA 112 keeps (stores) a current intermediate calculation value for LRC (S1212).

Then, the DMA 112 starts data transfer 2 (S1213) corresponding to the parameter setting 2 (S1202). In this step (S1213), the DMA 112 also takes over the intermediate calculation value for LRC kept after the data transfer 1 corresponding to the parameter setting 1 (S1201) in which the chain ID is shared with the parameter setting 2.

Note that, as shown in FIG. 12, the parameter setting 3 (S1203) is performed during execution of the data transfer 2. Upon completion of the data transfer 2 (S1213), the DMA 112 keeps (stores) a current intermediate calculation value for LRC. At the same time, the DMA 112 also copies, to the TFLRC buffer 1124, this intermediate calculation value for LRC based on the data transfer 2 as an intermediate calculation value for LRC with the chain ID of 0 (S1214).

Then, the DMA 112 starts data transfer 3 (S1215) corresponding to the parameter setting 3 (S1203). Upon completion of the data transfer 3, the DMA 112 keeps (stores) a current intermediate calculation value for LRC (S1216). At the same time, the DMA 112 also copies, to the TFLRC buffer 1124, this intermediate calculation value for LRC based on the data transfer 3 as an intermediate calculation value for LRC with the chain ID of 1 (S1217).

Subsequently, the DMA 112 starts data transfer 4 (S1218) corresponding to the parameter setting 4 (S1204). At the same time, the DMA 112 reads, from the TFLRC buffer 1124, the intermediate calculation value for LRC with the chain ID of 0 having been copied thereto in S1214 (S1219). Then, the DMA 112 calculates an LRC based on the data transfer 4 by using the intermediate calculation value for LRC having been read in S1219 (takes over the intermediate calculation value). Upon completion of the data transfer 4 (S1220), the DMA 112 copies, to the TFLRC buffer 1124, this intermediate calculation value for LRC based on the data transfer 4 as an intermediate calculation value for LRC with the chain ID of 0 (S1221).

Then, the DMA 112 starts data transfer 5 (S1222) corresponding to the parameter setting 5 (S1205). At the same time, the DMA 112 reads, from the TFLRC buffer 1124, the intermediate calculation value for LRC with the chain ID of 1 having been copied thereto in S1217 (S1223). Then, the DMA 112 calculates an LRC based on the data transfer 5 by using the intermediate calculation value for LRC having been read in S1223 (takes over the intermediate calculation value). Upon completion of the data transfer 5 (S1224), the DMA 112 copies, to the TFLRC buffer 1124, this intermediate calculation value for LRC based on the data transfer 5 as an intermediate calculation value for LRC with the chain ID of 1 (S1225).

Note that, upon completion of the entire data transfer for each transfer parameter performed in this manner, the DMA 112 adds a first integrity code (TFLRC) to the last fixed-length data set 712. Then, the DMA 112 sends status information to the MP 13, and the MP 13 receives the status information. Thereby, the entire processing completes.

As shown in FIG. 11 or 12, in the storage apparatus 10 according to this embodiment, not the MP 13 but each DMA 112 manages intermediate calculation values for LRC in data transfer corresponding to each transfer parameter that is set on the DMA 112. The storage apparatus 10 may have a configuration in which the MP 13 manages intermediate calculation values for LRC as shown in FIG. 13, for example. However, in this configuration, an intermediate calculation value for LRC needs to be sent from the DMA 112 to the MP 13, or from the MP 13 to the DMA 112 on an as-needed basis every time each DMA 112 transfers any data. Thus, this configuration has poorer performance than the configuration in which each DMA 112 manages intermediate calculation values for LRC.

In addition, as described above, when each DMA 112 manages intermediate calculation values for LRC, the MP 13 can set transfer parameters on the DMA 112 without waiting for the DMA 112 to send back status information. Thus, immediately after completing previous data transfer, the DMA 112 can start the next data transfer. This further contributes to processing performance improvement of the storage apparatus 10.

FIG. 14A shows a data storage form (data format) employed when data that includes the C part 411 of 8 Bytes and the D part 413 of 1024 Bytes is stored in the storage apparatus 10 including the CM 14 in which data is managed in units of 520 Bytes. More specifically, the above data is stored in the hard disk drives 171 (520 Bytes/sector) of a FC (Fibre Channel) type after integrity codes are added to the data by the aforementioned first scheme.

Meanwhile, FIG. 14B shows a data storage form employed when data having the above structure is stored in the hard disk drives 171 of FC type after integrity codes are added to the data by the aforementioned second scheme.

Comparison between these two forms shows that data storage positions (data formats) are basically the same as each other, though these forms are different in that either FLRC or TFLRC is added to each particular D part 413 as the integrity code. Thus, introduction of the second scheme to the storage apparatus 10 that employs the first scheme, for example, requires little change in software executed by the CHAs 11, the DKAs 12, the MP 13 and the like.

FIG. 14C shows a data storage form employed when data having the above structure is stored in the storage apparatus 10 including the CM 14 in which data is managed in units of 520 Bytes (which is a management mode prepared for hard disk drives of a FC type). More specifically, the above data is stored in the hard disk drives 171 (512 Bytes/sector) of a SATA (Serial Advanced Technology Attachment) type after integrity codes are added to the data by the aforementioned first scheme.

As shown in FIG. 14C, each SATA drive has a sector size of 512 Bytes, which is different from the unit size (520 Bytes) of data managed in the CM 14. Accordingly, positions of the second integrity codes (SLRCs) and data starting positions are different from one sector to another, which complicates the data format as shown in FIG. 14C.

FIG. 14D shows a data storage form employed when data having the above structure is stored in the storage apparatus 10 including the CM 14 in which data is managed in units of 520 Bytes. More specifically, the above data is stored in the hard disk drives 171 (512 Bytes/sector) of a SATA type after integrity codes are added to the data by the aforementioned second scheme. As shown in FIG. 14D, second integrity codes (SLRCs) are omitted in this example.

As described above, in the case of SATA drives, by omitting a second integrity code (SLRC) of 8 Bytes from a data format of a unit size of data managed in the CM 14, it is possible to make the data format correspond to a data format of a sector of each SATA drive. Note that, though an integrity assurance function provided by the second integrity code (SLRC) is lost in this case, functions of detecting old data remaining and data corruption are assured by the first integrity code (TFLRC). In addition, even though the second integrity code (SLRC) includes position information, omission of the second integrity code (SLRC) will not affect the I/O function of each hard disk drive 171; for the C part 411 includes the equivalent information.

Note that employment of the data format shown in FIG. 14D also reduces loads in generating integrity codes when data sets each having a size smaller than a sector are stored in the sector. Specifically, suppose the case where data in a certain sector is partially rewritten. In this case, if a second integrity code (SLRC) is added to each sector (the second integrity code (SLRC) is not omitted), the second integrity code (SLRC) for the sector needs to be generated based on the entire data in the sector, as shown in FIG. 15A. On the other hand, if the data format shown in FIG. 14D is employed, it is only necessary to generate integrity codes (FLRCs in FIG. 15B) by referring only to the rewritten portion of the data as shown in FIG. 15B.

Hereinabove, description has been given of this embodiment. However, the above embodiment is presented only to facilitate understanding of the present invention, and thus not to provide limited interpretation of the present invention. The present invention can be modified or improved without departing from the gist thereof, and the equivalents of the present invention are also included in the present invention.

The invention claimed is:

1. A storage apparatus, comprising:
a channel control unit that communicates with a host computer;
a disk control unit that controls a hard disk drive; and
a cache memory accessible by the channel control unit and the disk control unit, wherein
the channel control unit that, upon receiving an I/O request from the host computer, sends or receives data to or from the disk control unit via the cache memory, the data to be written to or to be read from the hard disk drive in accordance with the I/O request,
the channel control unit includes
a variable-length DMA (Direct Memory Access) that performs data transfer of variable-length data sent or received to or from the host computer in accordance with the I/O request,
a fixed-length DMA that performs data transfer of fixed-length data to and from the cache memory, and
a buffer intervening between the variable-length DMA and the fixed-length DMA,
the fixed-length DMA, in performing the data transfer of the fixed-length data to the cache memory, is configured to:
divide the variable-length data into a plurality of data sets
add a first integrity code to a first data set which is one of the plurality of data sets, for integrity assurance of the plurality of date sets, the size of the first data set with the first integrity code is a first size which is equivalent to the size of each of the other ones of the plurality of data sets,
add a second integrity code to each of the plurality of data sets for integrity assurance of the respective date sets, the size of each of the plurality of data sets each including the second integrity code is a second size which is equivalent to a unit size of data managed in the cache memory, and
transfer the plurality of data sets each including the second integrity code as a plurality of fixed-length data sets to the cache memory, and
wherein the second integrity code is eliminated from the respective data sets if the hard disk drive is a first type drive so that the plurality of fixed-length data sets in which each size is the second size can be managed as a plurality of fixed-length data sets in which each size is the first size, which is equivalent to a unit size of data managed in the first type drive.

2. The storage apparatus according to claim 1, further comprising:
a microprocessor that performs processing regarding data transfer among the channel control unit, the disk control unit and the cache memory, wherein
the microprocessor sets transfer parameters for transferring the variable-length data to the cache memory on the variable-length DMA and the fixed-length DMA, respectively, and
the fixed-length DMA stores an intermediate calculation value for the first integrity code generated in the data transfer corresponding to each of the transfer parameters, and generates the first integrity code based on the entire variable-length data by taking over the intermediate calculation value generated in the data transfer corresponding to each of the transfer parameters, when the data transfer of a certain one of the variable-length data to the cache memory is performed by setting the transfer parameters a plurality of times.

3. The storage apparatus according to claim 2, wherein
a chain ID which is an identifier assigned to each CCW (Channel Command Word) chain is provided to the transfer parameter that is set on the fixed-length DMA, and
the fixed-length DMA stores the intermediate calculation value for each of the chain IDs, and generates the first integrity code based on the entire variable-length data for each of the chain IDs by taking over the intermediate calculation value generated in the data transfer corresponding to each of the transfer parameters.

4. The storage apparatus according to claim 1, wherein
the data size equivalent to the unit size of data managed in the cache memory is a data size equivalent to a sector size of a hard disk drive of FC (Fibre Channel) type,
the fixed-length DMA generates the second integrity code based on the fixed-length data set for each of the fixed-length data sets, and
the disk control unit
stores data into each sector of the hard disk drive of the storage apparatus, the data to which the second integrity code is added while the first integrity code is further added to the data to be stored in a sector in which the last fixed-length data set is written, when the hard disk drive is a hard disk drive of FC type, and
stores data into each sector of the hard disk drive of the storage apparatus, the data to which the second integrity code is not added but the first integrity code is added to be stored in the sector in which the last fixed-length data set is written, when the hard disk drive is a hard disk drive of SATA (Serial Advanced Technology Attachment) type.

5. The storage apparatus according to claim 1, wherein
the variable-length data is data of CKD (Count Key Data architecture) format, and
the fixed-length DMA newly generates the fixed-length data set for storing therein the first integrity code when an end address of a D part of the variable-length data is equal to the end address of the last fixed-length data set.

6. A storage apparatus, comprising:
at least one channel control unit that communicates with a mainframe;
at least one disk control unit that controls a hard disk drive;
a cache memory accessible by the channel control unit and the disk control unit; and a switch that couples the channel control unit, the disk control unit and the cache memory, wherein the channel control unit, upon receiving an I/O request from the mainframe, sends or receives data to or from the disk control unit via the cache memory, the data to be written to or to be read from the hard disk drive in accordance with the I/O request, the channel control unit includes a protocol controller that performs processing regarding a protocol for communications with the mainframe, a variable-length DMA that performs data transfer of variable-length data sent or received to or from the mainframe in accordance with the I/O request, a fixed-length DMA that performs data transfer of fixed-length data to and from the cache memory, a buffer intervening between the protocol controller and the variable-length DMA, and a buffer intervening between the variable-length DMA and the fixed-length DMA, the fixed-length DMA, in performing the data transfer of the fixed-length data to the cache memory, is configured to:

divide the variable-length data into a plurality of data sets, add a first integrity code to a first data set which is one of the plurality of data sets, for integrity assurance of the plurality of date sets, the size of the first data set with the first integrity code is a first size which is equivalent to the size of each of the other ones of the plurality of data sets, add a second integrity code to each of the plurality of data sets for integrity assurance of the respective date sets, the size of each of the plurality of data sets each including the second integrity code is a second size which is equivalent to a unit size of data managed in the cache memory, and transfer the plurality of data sets each including the second integrity code as a plurality of fixed-length data sets to the cache memory, and wherein the second integrity code is eliminated from the respective data sets if the hard disk drive is a first type drive so that the plurality of fixed-length data sets in which each size is the second size, can be managed as a plurality of fixed-length data sets in which each size is the first size, which is equivalent to a unit size of data managed in the first type drive.

7. A data integrity assurance method in a storage apparatus which includes:

a channel control unit that communicates with a host computer;

a disk control unit that controls a hard disk drive; and a cache memory accessible by the channel control unit and the disk control unit, and in which the channel control unit, upon receiving an I/O request from the host computer, sends or receives data to or from the disk control unit via the cache memory, the data to be written to or to be read from the hard disk drive in accordance with the I/O request, and the channel control unit includes a variable-length DMA that performs data transfer of variable-length data sent or received to or from the host computer in accordance with the I/O request, a fixed-length DMA that performs data transfer of fixed-length data to and from the cache memory, and a buffer intervening between the variable-length DMA and the fixed-length DMA, the method comprising:

the fixed-length DMA performing the data transfer of the fixed-length data to the cache memory by:

dividing the variable-length data into a plurality of data sets;

adding a first integrity code to a first data set, which is one of the plurality of data sets, for integrity assurance of the plurality of date sets, the size of the first data set with the first integrity code is a first size which is equivalent to the size of each of the other ones of the plurality of data sets;

adding a second integrity code to each of the plurality of data sets for integrity assurance of the respective date sets, the size of each of the plurality of data sets each including the second integrity code is a second size which is equivalent to a unit size of data managed in the cache memory; and transferring the plurality of data sets each including the second integrity code as a plurality of fixed-length data sets to the cache memory,;

wherein the second integrity code is eliminated from the respective data sets if the hard disk drive is a first type drive so that the plurality of fixed-length data sets in which each size is the second size, can be managed as a plurality of fixed-length data sets in which each size is the first size, which is equivalent to a unit size of data managed in the first type drive.

8. The data integrity assurance method according to claim 7, wherein the storage apparatus further comprises a microprocessor that performs processing regarding data transfer among the channel control unit, the disk control unit and the cache memory, the microprocessor sets transfer parameters for transferring the variable-length data to the cache memory on the variable-length DMA and the fixed-length DMA, respectively, and the fixed-length DMA generates the first integrity code based on the entire variable-length data stores an intermediate calculation value for the first integrity code generated in the data transfer corresponding to each of the transfer parameters, and generates the first integrity code based on the entire variable-length data by taking over the intermediate calculation value generated in the data transfer corresponding to each of the transfer parameters, when the data transfer of certain variable-length data to the cache memory is performed by setting the transfer parameters a plurality of times.

9. The data integrity assurance method according to claim 8, wherein a chain ID which is an identifier assigned to each CCW chain is provided to the transfer parameter that is set on the fixed-length DMA, and the fixed-length DMA stores the intermediate calculation value for each of the chain IDs, and generates the first integrity code based on the entire variable-length data for each of the chain IDs by taking over the intermediate calculation value generated in the data transfer corresponding to each of the transfer parameters.

10. The data integrity assurance method according to claim 7, wherein the data size equivalent to the unit size of data managed in the cache memory is a data size equivalent to a sector size of a hard disk drive of FC type, the fixed-length DMA generates the second integrity code based on the fixed-length data set for each of the fixed-length data sets, and the disk control unit stores data into each sector of the hard disk drive of the storage apparatus, the data to which the second integrity code is added while the first integrity code is further added to the data to be stored in a sector in which the last fixed-length data set is written, when the hard disk drive is a hard disk drive of FC type, and stores data into each sector of the hard disk drive of the storage apparatus, the data to which the second integrity code is not added but the first integrity code is added to be stored in the sector in which the last fixed-length data set is written, when the hard disk drive is a hard disk drive of SATA (Serial Advanced Technology Attachment) type.

11. The data integrity assurance method according to claim 7, wherein the variable-length data is data of CKD format, and the fixed-length DMA newly generates the fixed-length data set for storing therein the first integrity code when an end address of a D part of the variable-length data is equal to the end address of the last fixed-length data set.

12. A data integrity assurance method in a storage apparatus which includes:

at least one channel control unit that communicates with a mainframe;

at least one disk control unit that controls a hard disk drive;

a cache memory accessible by the channel control unit and the disk control unit;

a switch that couples the channel control unit, the disk control unit and the cache memory, and in which the channel control unit, upon receiving an I/O request from the mainframe, sends or receives data to or from the disk control unit via the cache memory, the data to be written to or to be read from the hard disk drive in accordance with the I/O request, and the channel control unit includes a protocol controller that performs processing regarding a protocol for communications with the mainframe, a variable-length DMA that performs data transfer of variable-length data sent or received to or from the mainframe in accordance with the I/O request, a fixed-length DMA that performs data transfer of fixed-length data to and from the cache memory, a buffer intervening between the protocol controller and the variable-length DMA, and a buffer intervening between the variable-length DMA and the fixed-length DMA, the method comprising:

the fixed-length DMA performing the data transfer of the fixed-length data to the cache memory by:

dividing the variable-length data into a plurality of data sets adding a first integrity code, for integrity assurance of the plurality of date sets, the size of the first data set with the first integrity code is a first size which is equivalent to the size of each of the other ones of the plurality of data sets;

adding a second integrity code to each of the plurality of data sets for integrity assurance of the respective date sets, the size of each of the plurality of data sets each including the second integrity code is a second size which is equivalent to a unit size of data managed in the cache memory; and transferring the plurality of data sets each including the second integrity code as a plurality of fixed-length data sets to the cache memory, wherein the second integrity code is eliminated from the respective data sets if the hard disk drive is a first type drive so that the plurality of fixed-length data sets in which each size is the second size, can be managed as a plurality of fixed-length data sets in which each size is the first size which is equivalent to a unit size of data managed in the first type drive.

13. The storage apparatus according to claim 1, wherein the fixed-length data set of the first data size is the last data set in the plurality of data sets.

14. The storage apparatus according to claim 1, wherein even when the last data set of the variable-length data sets fits within the size of the fixed-length data set, the fixed-length DMA automatically generates a new fixed-length data set for storing therein the first integrity code.

15. The storage apparatus according to claim 7, wherein the fixed-length data set of the first data size is the last data set in the plurality of data sets.

16. The storage apparatus according to claim 7, wherein even when the last data set of the variable-length data sets fits within the size of the fixed-length data set, the fixed-length DMA automatically generates a new fixed-length data set for storing therein the first integrity code.

* * * * *